March 10, 1959 G. T. BAKER 2,877,306

TELECOMMUNICATION SYSTEMS

Filed Oct. 31, 1956 21 Sheets-Sheet 1

George Thomas Baker
by Dasree Steinberg
attorney

March 10, 1959 G. T. BAKER 2,877,306

TELECOMMUNICATION SYSTEMS

Filed Oct. 31, 1956 21 Sheets-Sheet 2

George Thomas Baker
by [illegible]
attorney

March 10, 1959 G. T. BAKER 2,877,306

TELECOMMUNICATION SYSTEMS

Filed Oct. 31, 1956 21 Sheets-Sheet 3

George Thomas Baker
by Dennie Sleicking
Attorney

March 10, 1959 G. T. BAKER 2,877,306

TELECOMMUNICATION SYSTEMS

Filed Oct. 31, 1956 21 Sheets-Sheet 4

George Thomas Baker
by Desiré Steinberg
Attorney.

George Thomas Baker
by
Attorney

March 10, 1959 G. T. BAKER 2,877,306

TELECOMMUNICATION SYSTEMS

Filed Oct. 31, 1956 21 Sheets-Sheet 6

George Thomas Baker
by Dennis [illegible]
Attorney

George Thomas Baker
by [illegible]
attorney

George Thomas Baker
by Dennis Stirling
attorney

March 10, 1959 G. T. BAKER 2,877,306

TELECOMMUNICATION SYSTEMS

Filed Oct. 31, 1956 21 Sheets-Sheet 9

George Thomas Baker
by Dearne Slivberg
Attorney

George Thomas Baker
by Dean Steinberg
Attorney

March 10, 1959 G. T. BAKER 2,877,306

TELECOMMUNICATION SYSTEMS

Filed Oct. 31, 1956 21 Sheets-Sheet 11

George Thomas Baker
by Dennis Sheinberg
attorney

March 10, 1959 G. T. BAKER 2,877,306

TELECOMMUNICATION SYSTEMS

Filed Oct. 31, 1956 21 Sheets-Sheet 12

George Thomas Baker
by Deane Steinberg
Attorney

March 10, 1959 G. T. BAKER 2,877,306

TELECOMMUNICATION SYSTEMS

Filed Oct. 31, 1956 21 Sheets-Sheet 13

George Thomas Baker
by Dennis Stirling
attorney

George Thomas Baker
by Dearve Steinway
attorney

March 10, 1959 G. T. BAKER 2,877,306

TELECOMMUNICATION SYSTEMS

Filed Oct. 31, 1956 21 Sheets-Sheet 15

George Thomas Baker
by Dennis Stirling
attorney

George Thomas Baker
by [signature]
Attorney

George Thomas Baker
by Deane Steinberg
attorney

George Thomas Baker
by Dearne Stinery
attorney

George Thomas Baker
by Desmond Hemming
attorney

George Thomas Baker
by Dennis [illegible]
Attorney

George Thomas Baker
by Deane Stillberg
Attorney

United States Patent Office 2,877,306

Patented Mar. 10, 1959

2,877,306

TELECOMMUNICATION SYSTEMS

George Thomas Baker, Taplow, England, assignor to British Telecommunications Research Limited, Taplow, England, a British company Application October 31, 1956, Serial No. 619,495

Claims priority, application Great Britain November 3, 1955

22 Claims. (Cl. 179—18)

Figure 1:
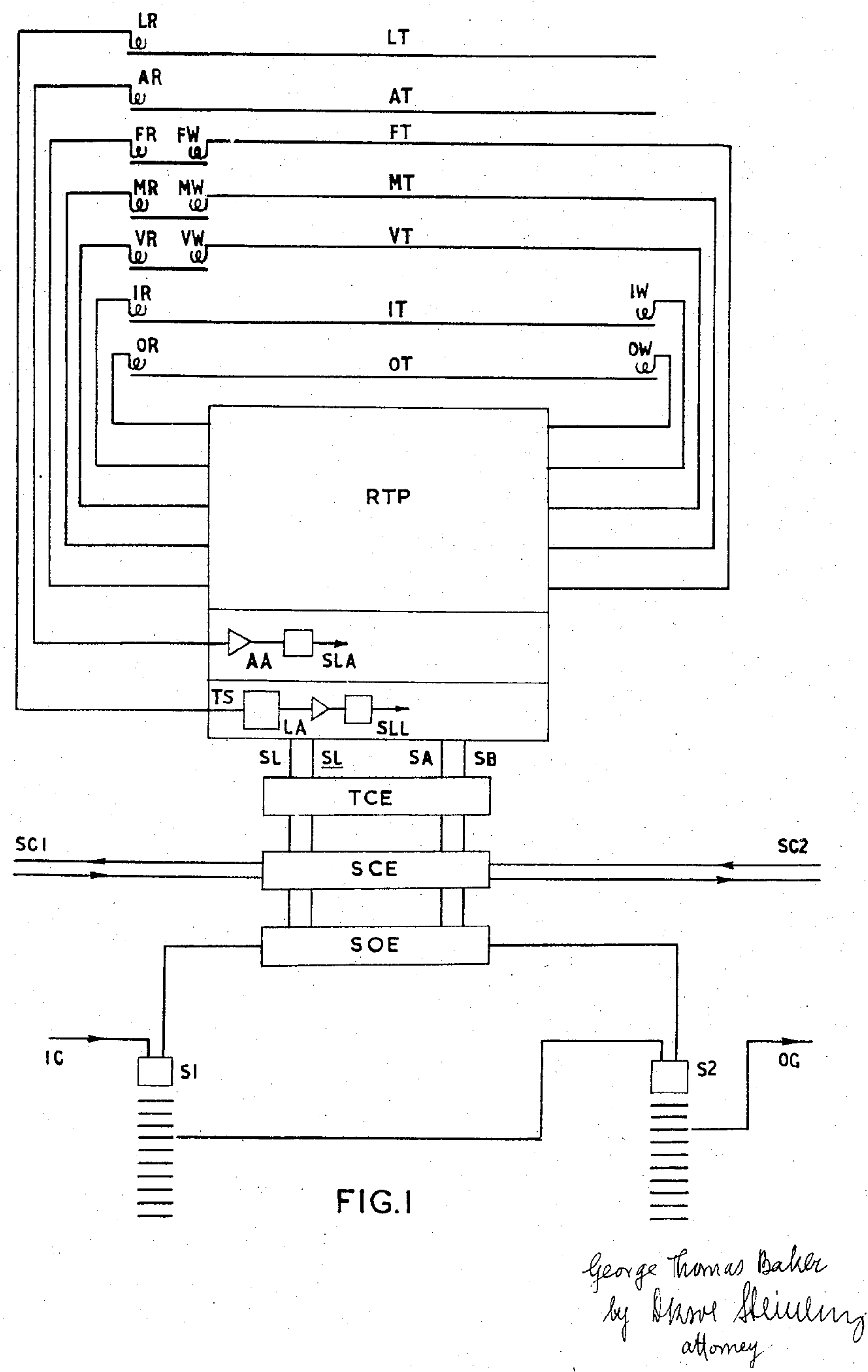

The present invention relates to telecommunication systems, for instance automatic telephone systems, and is more particularly concerned with systems which make use of high-speed register devices of the magnetic drum type.

It has already been proposed to employ such devices to furnish translated exchange codes in the same manner as is done by so-called directors, as employed for instance in the London telephone system, and the present invention represents a development of this principle whereby connections extending over long distances may be set up with the minimum of delay. The chief object of the invention is to provide high-speed transit exchange working by means of which improved and more expeditious operation is obtained in the routing of transit traffic.

According to one feature of the invention, information as to the desired destination which arrives over an incoming junction is registered on one track of a magnetic drum and in accordance with its value controls the selection of another track on the same or another drum. This track is associated with a group of outgoing junctions in the required direction and the information, which may be modified in view of the process of partial selection which has already taken place, is then transferred to it and may at once be transmitted over an idle outgoing junction in the required group which will subsequently be used for the completion of the connection or over a channel common to this group.

The chosen junction, the identity of which is marked among the information originally registered and will also be transmitted over the common channel so as to permit the selection of the incoming end, may extend to another transit exchange and the process may be repeated thereat and subsequently as often as necessary. When the terminating exchange is reached, the information still remaining, e. g. the wanted party's number in that exchange, is used to ascertain whether the wanted line is free and if so, to operate switches to connect with it and at the same time the necessary switches in the speaking route in the various transit exchanges may be set up more or less simultaneously.

Transmission of the information from one transit exchange to another should obviously be effected as rapidly as possible and according to another feature of the invention a special form of signalling is employed, whereby the information in binary form is transmitted by means of a carrier wave of voice frequency which will pass through any repeaters on the route.

Though the code used for transmission is essentially binary, it is preferably modified so as to give a self-checking feature. This may make use of known two-out-of-five codes or may employ a modification whereby the number of units transmitted is always an odd number, an additional control element being added to the binary number. The signalling code preferably also includes a start signal and an erase signal which is transmitted back when the code has been correctly received in order to erase the registration at the sending end. The code also includes a synchronising signal which is transmitted when no information requires to be sent and serves to maintain the timing devices at the two ends in synchronism and also to prevent unnecessary operation of automatic gain regulating equipment which might otherwise take place.

The invention will be better understood from the following description of one method of carrying it into effect which should be taken in conjunction with the accompanying drawings comprising Figs. 1–32. This assumes that a transit exchange is concerned and that signalling between this exchange and other exchanges is effected over signalling channels common to groups of junctions leading in the same direction.

Figure 7:
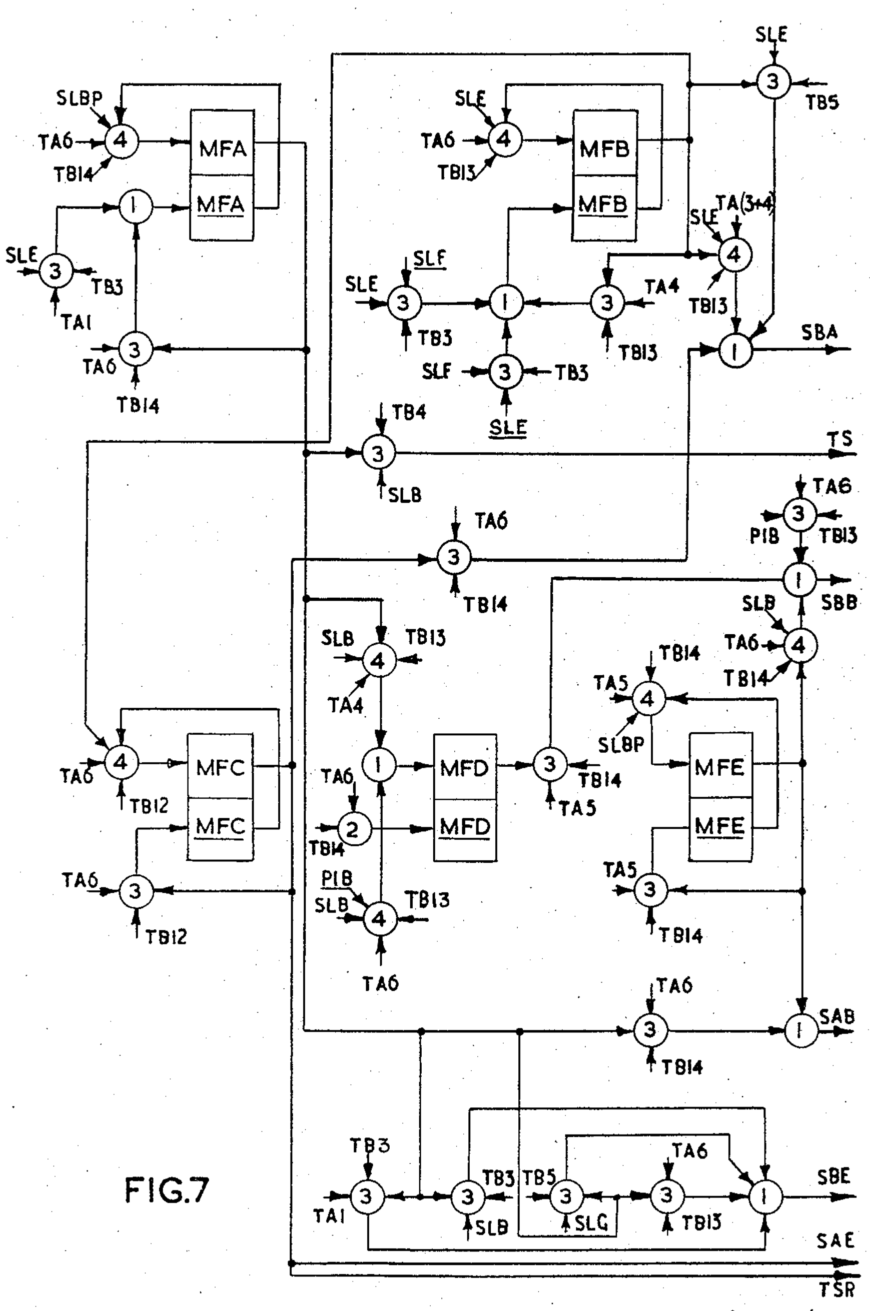
Figure 8:
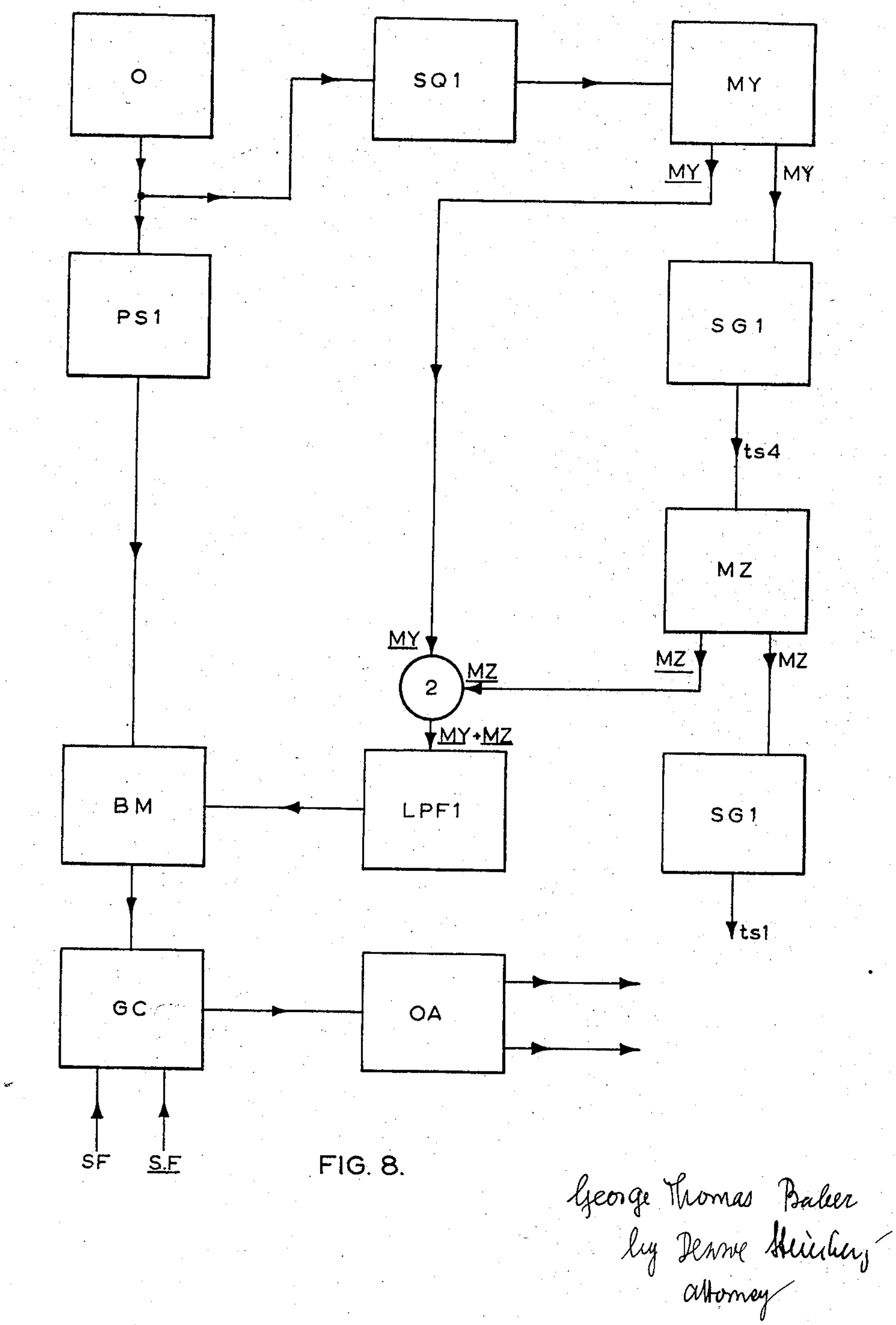
Figure 9:
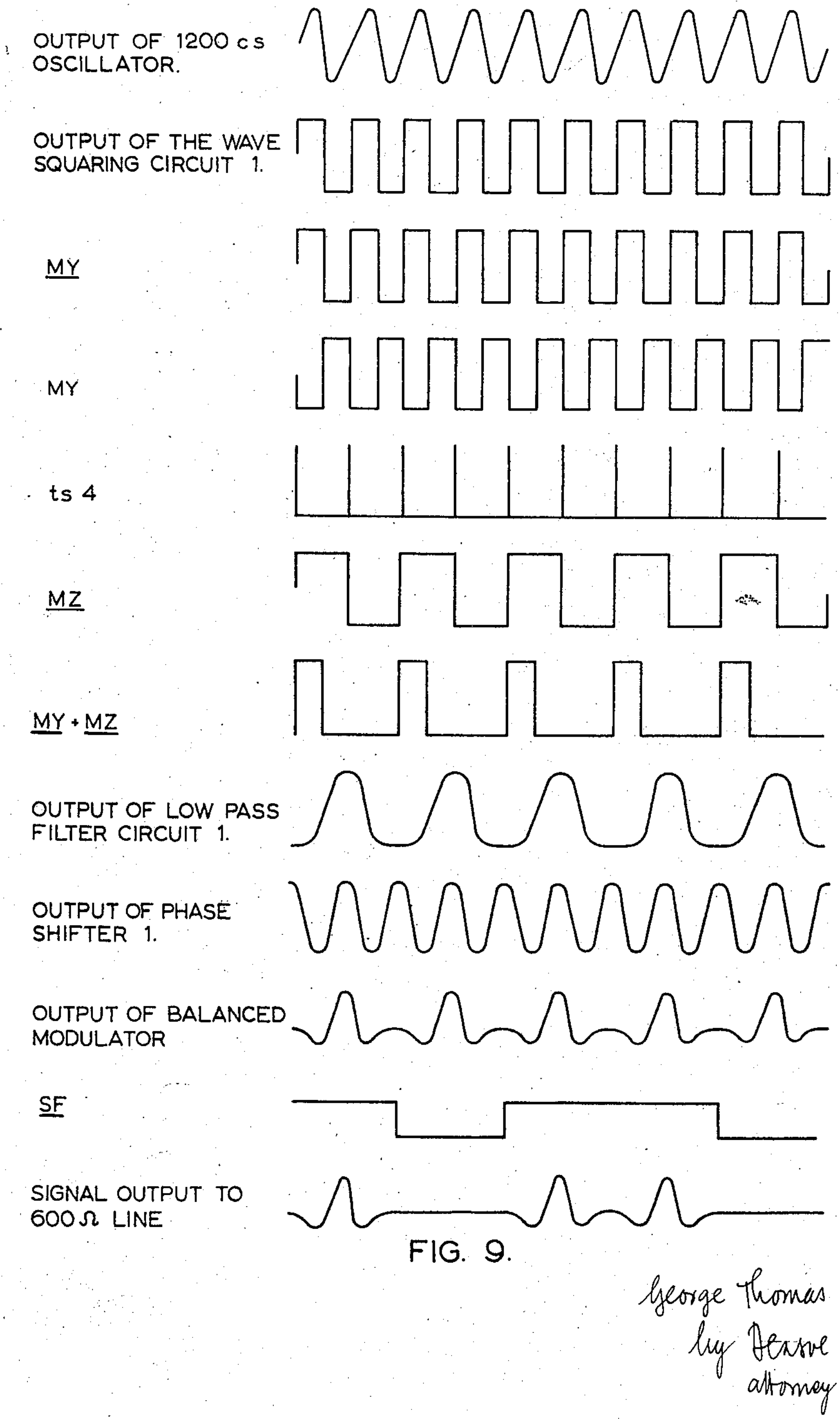
Figure 10:
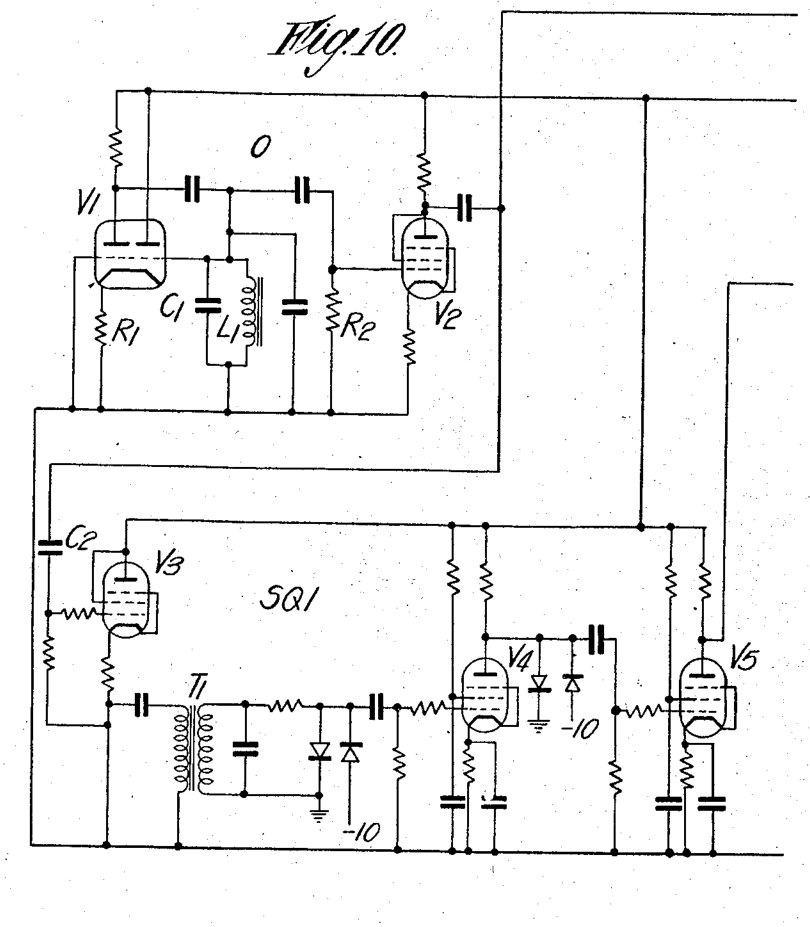
Figure 11:
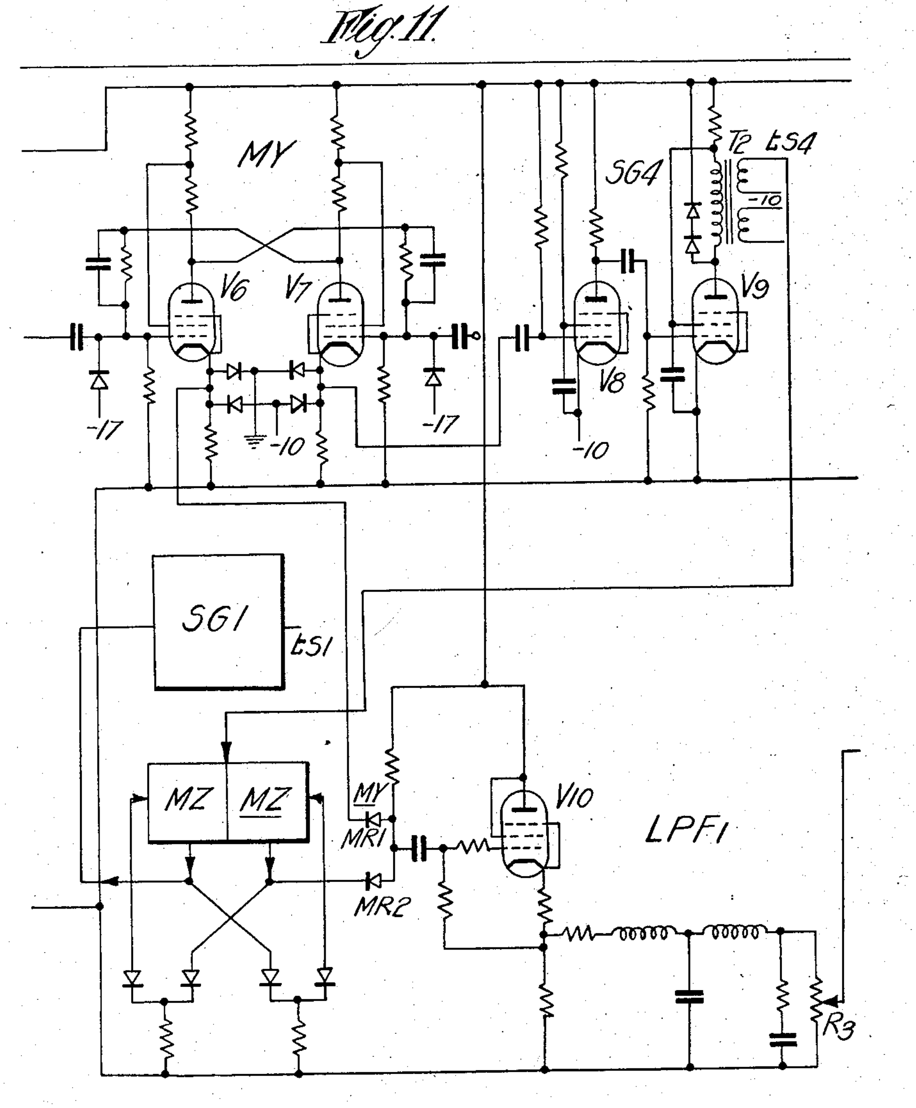
Figure 12:
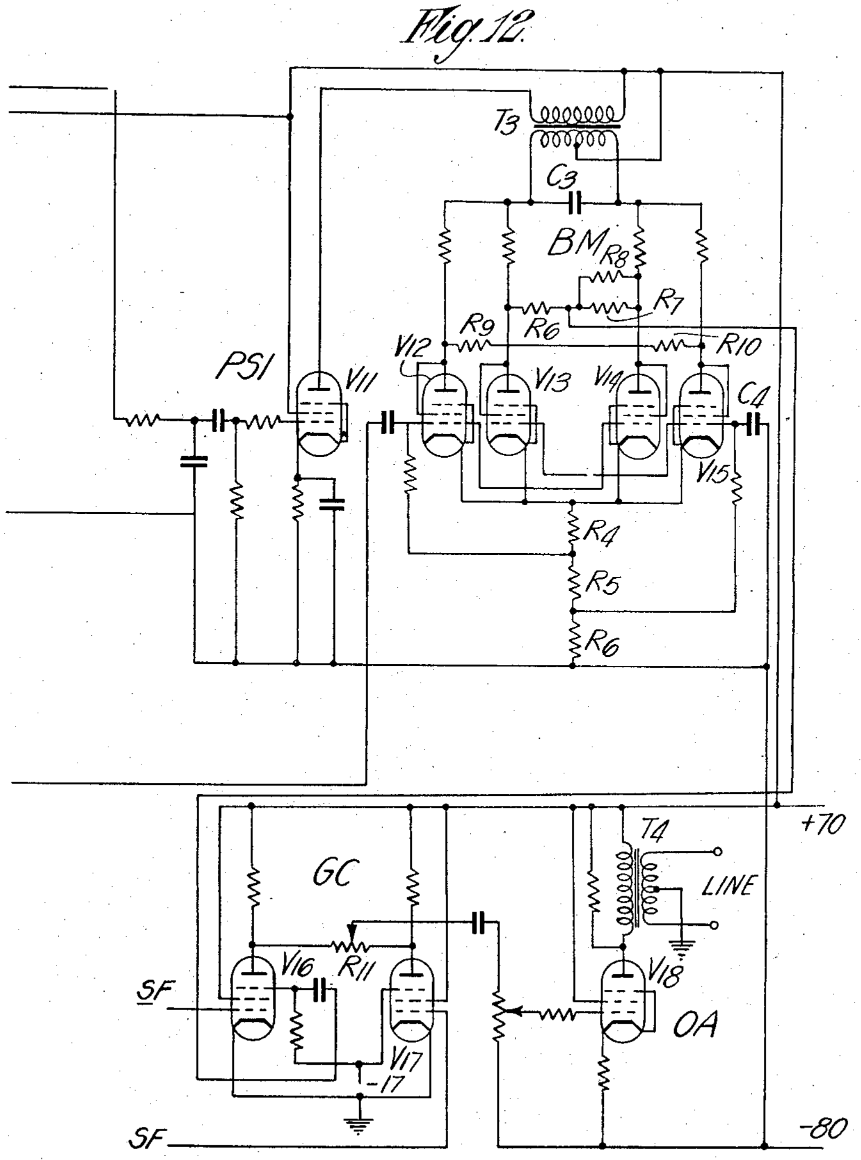
Figure 13:
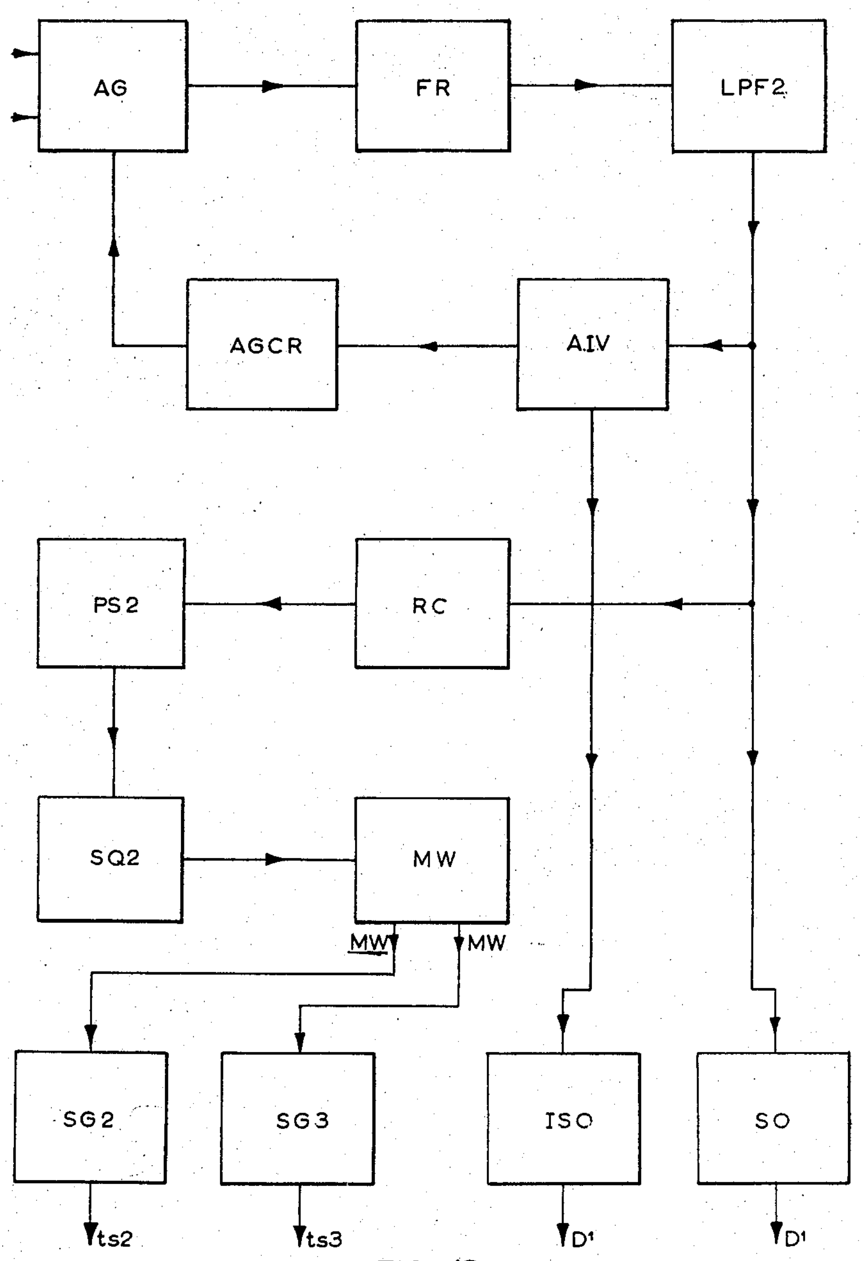
Figure 14:
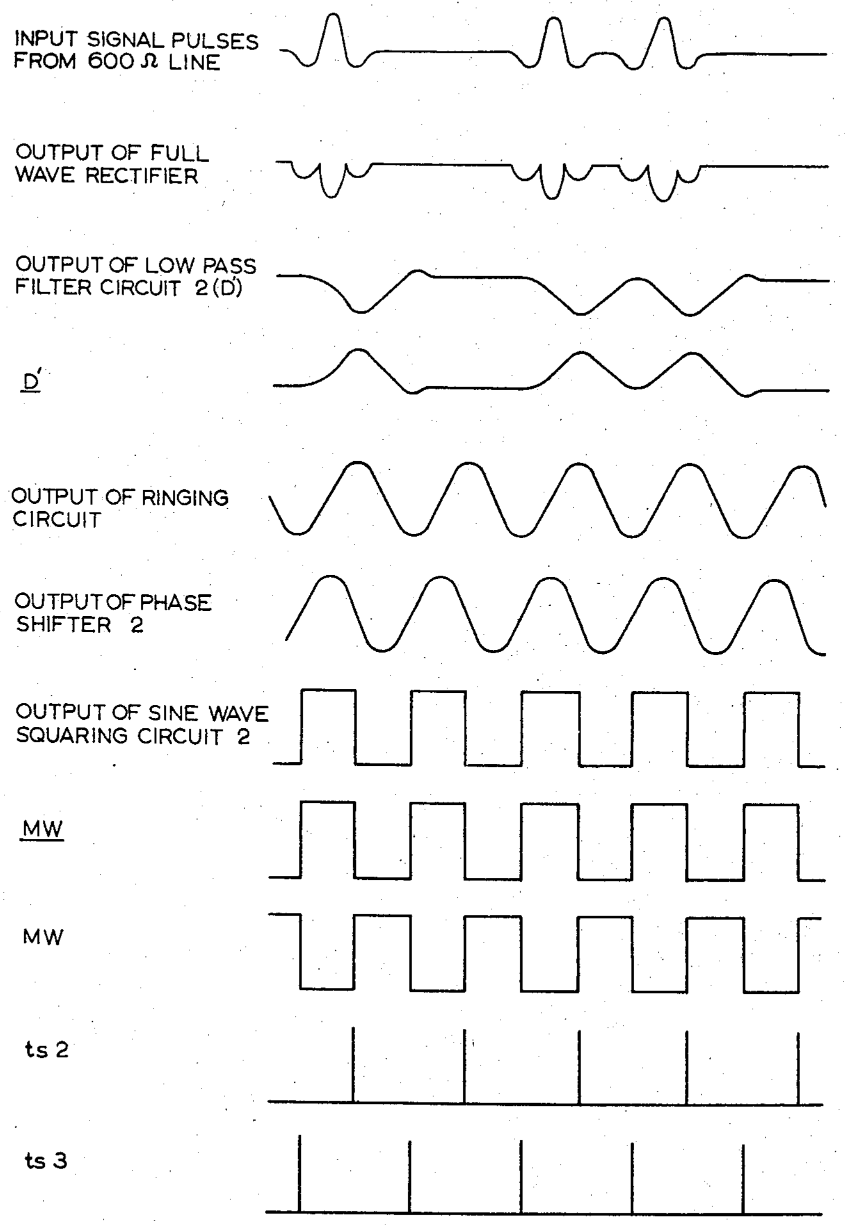

Fig. 1 illustrates diagrammatically the layout of the magnetic drum register in a transit exchange together with its control equipment and also indicates an incoming interexchange junction extending to a switch of the Strowger type and also an outgoing junction extending from one level of a similar switch to a corresponding switch in a different exchange. Figs. 2–7 indicate, in conventional manner, certain of the circuits involving electronic relays or toggle circuits for controlling the reading and writing operations on the drum. Fig. 8 is a block diagram of the pulse generating equipment for the transmission of information over a common channel, the continuous series of pulses produced by the equipment being gated in accordance with the information it is desired to transmit. Fig. 9 shows a number of waveforms applicable to different parts of the block diagram of Fig. 8. Figs. 10–12 represent detailed circuits applicable to the various blocks shown in Fig. 8. Fig. 13 is a similar block diagram of the equipment at the receiving end. Fig. 14 shows corresponding waveforms and Figs. 15–17 indicate detailed circuits applicable to the diagram of Fig. 13. Figs. 18–32 show, in the same manner as Figs. 2–7, the circuits involving the various electronic relays or toggles which are used primarily for controlling the actual transmission between the registers at the two ends of the signalling channel.

It will be desirable initially to explain in greater detail the general layout of the system and the method of operation. It is known that, for most telephone circuits as at present constituted, information cannot be successfully transmitted at a speed much in excess of 650 binary elements or "bits" per second, and to allow a suitable margin, it is proposed to transmit, in the present system, at a speed of 600 bits per second. The carrier current employed is of 1200 cycles per second representing the mid-frequency of the normal telephone band so that each bit comprises two complete cycles of the carrier current and this simplifies the arrangements in that no phase change takes place. It is proposed, moreover, to modulate the carrier current by a waveform resembling a Gaussian curve since this offers certain advantages as regards reliability of transmission with comparatively simple equipment. Thus, pulses of the required shape can be produced by modulating a 1200 c./s. carrier sine wave with a 600 c./s. waveform resembling a continuous series of Gaussian curves, as will appear more clearly in connection with the waveforms in Figs. 9 and 14.

The magnetic drum is assumed to be of the type now well known and may comprise an aluminium cylinder whose curved surface is coated with iron oxide which is rotated about its axis at substantially constant speed and is provided with the necessary reading and writing heads defining a number of tracks round the circumference. The expression "drum" however is intended to be interpreted sufficiently widely to cover a disc or an endless tape. The drum has associated with it a clock system directly related to its speed of rotation which provides the pulses TA and TB on the basis that six TA pulses equal one TB pulse and fourteen TB pulses correspond to the length of one register. It will be assumed that ten registers form a complete track but some other number may be arbitrarily chosen to suit the particular circumstances.

Each equipment also includes another clock system which provides pulses TX for controlling transmission at the frequency of 600 bits per second and there is also a TY clock which operates at the same nominal frequency as the TX clock but which controls reception and is regulated by the TX clock at the sending end. Since transmission may take place in both directions, there will be a TX and a TY clock associated with each drum though they are not directly related since the TY clock is controlled from a drum in another exchange. It is also desirable that there should be pulses corresponding to complete digits as received over the signalling channel. These pulses are termed TZ and are on the basis that six TY's equal one TZ. It should be mentioned that with the usual drum speed the length of a TX pulse will be approximately equal to the scanning time of two complete registers.

In order to avoid the description becoming unduly complicated, certain simplifying assumptions will be made, though it will be understood that the invention is in no sense limited to the arrangement actually described and that modifications could readily be made to cover the circumstances more likely to be met with in practice. These assumptions are:

(1) That the exchange in question is purely a transit exchange and has no subscribers' lines connected to it but only incoming and outgoing junctions;

(2) That the incoming and outgoing junctions are used only for traffic in the directions indicated; that is to say, they are not equipped for two-way working;

(3) That a route represented by a group of junctions is provided with a common two-way information channel; that is to say, having a transmitter and receiver at each end;

(4) That no provision is made for re-routing;

(5) That there are a maximum of ten junctions in a group so that selection can be made by means of a single decimal digit.

This last assumption is not entirely consistent with the showing in Fig. 1 which indicates the use of Strowger switches which will normally have access to 100 lines. It will be appreciated that, in these circumstances, the switches will be required to respond to two trains of impulses, since the normal rotary hunting operation of a group selector is taken care of by the drum control equipment so that the switch requires positioning into engagement with a specific junction.

The general method of operation is that the incoming impulses, for instance, in the first place, from a calling sub-station, are recorded on a register track and are then compared with an address on a separate address track for which purpose the information is first transferred to a transfer track which is only one register long so that the information is repeated round the circumference of the drum. This operation enables selection to be made of a particular marking in a library track which serves to select the required group of junctions extending in the desired direction. This operation will normally concern only the initial portion of the information which is registered and the portion which has not so far been employed will be transmitted over the common signalling channel in order to control the routing at the succeeding transit exchange and subsequently at further exchanges. This operation is generally in accordance with that described in G. T. Baker's application Ser. No. 300,432, filed July 23, 1952.

Considering now Fig. 1, it will be seen that the drum is provided with at least seven tracks, one IT corresponding to the group of incoming junctions, in the appropriate position on which the incoming information is received, and one OT corresponding to the group of outgoing junctions in a particular direction, on which information for transmission forward is recorded. These are provided with reading heads IR and OR and writing heads IW and OW respectively. There are also one or more address tracks AT for locating the various registers and one or more library tracks LT containing permanent information for use in controlling the routing operation. Since no writing is required on these tracks during normal operation, they are shown as provided only with reading heads AR and LR respectively. These four tracks extend round the circumference of the drum and, as suggested above, each may represent ten registers. In addition there are three short tracks having their reading and writing heads spaced apart a distance equal to one register only. These represent the transfer track FT with reading head FR and writing head FW the function of which is well known, a transmitter track MT and a receiver track VT with corresponding heads MR, MW, VR and VW. The transmitter track is used for storing information which is to be transmitted over the common channel after it has been extracted from the appropriate register track and similarly the receiver track stores information received over the common signalling channel until it can be inserted into the appropriate register track.

The various reading and writing heads for the five lower tracks are indicated as connected to the regenerative track panels represented collectively by the rectangle RTP while as regards the address and library tracks, where no question of regeneration arises, the drawing indicates the amplifiers LA and AA and output circuits SLA and SLL. If a plurality of library tracks are provided, a track switching device TS will be required and it will be understood that track switching will also be needed for the various incoming and outgoing register tracks. Connected to the track panels are the control leads SL, $\overline{SL}$, SA and SB which extend to the translation control equipment indicated by TCE which in turn is connected to the signalling control equipment SCE associated with the two-way signalling channels SC1 and SC2. The control equipment also includes the switch operating equipment SOE which brings about the setting of the switches in the speaking route. These are shown conventionally as two Strowger type switches S1 and S2, S1 terminating the incoming junction IC and S2 giving access to the outgoing junction OG.

The arrangements for the control of the drum follow known practice and the convention will be adopted of indicating the output of a reading head as SL with the inverse as $\overline{SL}$ and a suitable suffix to indicate which particular reading head is concerned. The control of the writing head concerned. The suffixes which will be used appropriate potential on SA causing the writing of a 0 and potential on SB causing the writing of a 1. If potential is present on both leads simultaneously, the SB lead predominates and a 1 is written. In this case also suitable suffixes are employed to indicate the particular writing head is effected over the leads SA and SB, the are:

A for the incoming register track
B for the outgoing register track
C for the transmitter track
D for the receiver track
E for the transfer track
F for the incoming register address track
G for the outgoing register address track.

In some circumstances use may be made of a common address track for incoming and outgoing registers but it is thought desirable to describe the more general case.

A description will now be given of the operations which take place on the drum itself and subsequently a detailed description will be given of the equipment for transmitting information between exchanges and the manner in which it operates. As previously pointed out, this drum has to cater for the recording of information transmitted over an incoming junction, the transmission of related information over the chosen outgoing junction, the transmission of an erase signal back over the incoming junction if the information has been correctly received and the receipt of an erase signal transmitted back over the outgoing junction, assuming that this information also has been properly received.

The allocation of the storage spaces on the different tracks is set out in the following table which covers the storage space represented by one register.

choices so that the identity of the junction can be indicated by a single digit and this has been transmitted and stored in TB5 on the receiver track. The transmission also includes a marking in TA6.TB14 which indicates "Information in Receiver Track" and when this is detected, it operates the relay MAA shown in Fig. 2 in the circuit:

$$\underline{MAA}.SLD.TA6.TB14—MAA$$

The operation of MAA initiates hunting for the required incoming register and for this purpose the information in TB5 is compared with the information in the incoming

| Time pulse | Incoming register track (A) | Outgoing register track (B) | Transmitter track (C) | Receiver track (D) | Transfer track (E) |
|---|---|---|---|---|---|
| TB1 | Spare | Spare | Spare | Spare | Spare. |
| TB2.TA1 | Spare (TA1–6) | 1 Information transmitted. | 1–6 Spare | Spare | Spare. |
| 2–6 | | 2–6 Spare | | | |
| TB3.TA1 | Information to be transmitted. | 1–6 Number of incoming register in group. | Start signal (100011) | Spare | Number of incoming register. |
| 2–6 | Spare | | | | |
| TB4.TA1–6 | Translation digit | Number of group of incoming register. | Spare | Spare | Number of group of incoming register. |
| TB5.TA1–6 | Number of chosen outgoing register. | Spare | Number of incoming register. | Number of incoming register. | Number of chosen outgoing register. |
| TB(6–12) | Seven-digit subscriber's number (all tracks) | | | | |
| TB13 1 | Spare | 1 Spare | 1 Spare | 1 Spare | 1 Hunt for outgoing register. |
| 2 | Spare | 2 Hunt started | 2 Spare | 2 Spare | 2 Spare. |
| 3 | Called sub free | 3 Called sub free | 3 Called sub free | 3 Called sub free | 3 Called sub free. |
| 4 | Called sub busy | 4 Called sub busy | 4 Called sub busy | 4 Called sub busy | 4 Called sub busy. |
| 5 | Spare | 5 Spare | 5 Spare | 5 Spare | 5 Spare. |
| 6 | Junction in use | 6 Junction in use | 6 Spare | 6 Spare | 6 Hunt for incoming register. |
| TB14 1–4 | Spare | 1–4 Spare | 1–5 Spare | 1–5 Spare | 1–6 Spare. |
| 5 | Clear register | 5 Clear register | | | |
| 6 | Information to be transmitted back. | 6 Information to be transmitted back. | 6 Information in track | 6 Information in track | |

It will be appreciated that the transmitter, receiver and transfer tracks only occupy the space of one register and that, owing to the regenerative effect, the contents of these tracks are repeated over the full circumference of the drum. It will also be recalled that, in addition to the five tracks set out in the table, there are also one or more address tracks. In some circumstances a single address track can be made to serve satisfactorily for both incoming and outgoing junctions but in the present instance it will be assumed that separate address tracks are used for incoming and outgoing junctions and the normal and reverse outputs from these tracks will be indicated by SLF, $\underline{SLF}$, SLG and $\underline{SLG}$ respectively. In the ordinary operation of the drum, the records in these tracks are not altered so that the SA and SB leads do not come in question.

It will be appreciated that the information represented by the digits dialled by a calling subscriber will be set up on a register for instance in the manner described in G. T. Baker's application Ser. No. 300,431, filed July 23, 1952, now Patent No. 2,805,286. In the present instance, however, it is assumed that the drum is at a transit exchange and hence information is transmitted over the common channel associated with an incoming junction and is recorded in the receiver track in the manner to be described in detail subsequently. Since the signalling channel is common, it is now necessary for the information to be inserted in the register associated with the incoming junction which has been chosen. With the assumptions previously made, there are only ten possible register address track. As long as correspondence is not found, MAA is restored in the circuit:

$$(SLF.\underline{SLD}+\underline{SLF}.SLD).TB5—\underline{MAA}$$

When there is identity, however, relay MAA will not be restored in position TB5 and as a result the information in the receiver track is copied into the chosen register track in the circuit:

$$MAA.SLD.TB(6\text{–}12)—SBA$$

When the end of the register is reached, toggle MAB is operated in the circuit:

$$\underline{MAB}.MAA.TA6.TB14—MAB$$

and MAB then clears the receiver track:

$$MAB—SAD$$

At the end of this operation, MAB is restored $$MAB.TA6.TB14—\underline{MAB}$$

and a similar circuit produces reset of MAA:

$$MAA.TA6.TB14—\underline{MAA}$$

Translation in accordance with the information in the incoming register track now takes place in known manner making use of the transfer track and the appropriate library track, for instance as described in G. T. Baker's application Serial No. 300,432, previously mentioned. With the assumptions already made, this translation will be into a single digit to indicate the particular group of out-going junctions over which the next stage of signalling is to be effected. This digit is written into TB4 via the transfer track and when this operation is completed a marking is made in TA1.TB3 as an instruction to transmit. The next operation, therefore, is hunting for a register associated with a free outgoing line in the required group.

Figure 3:
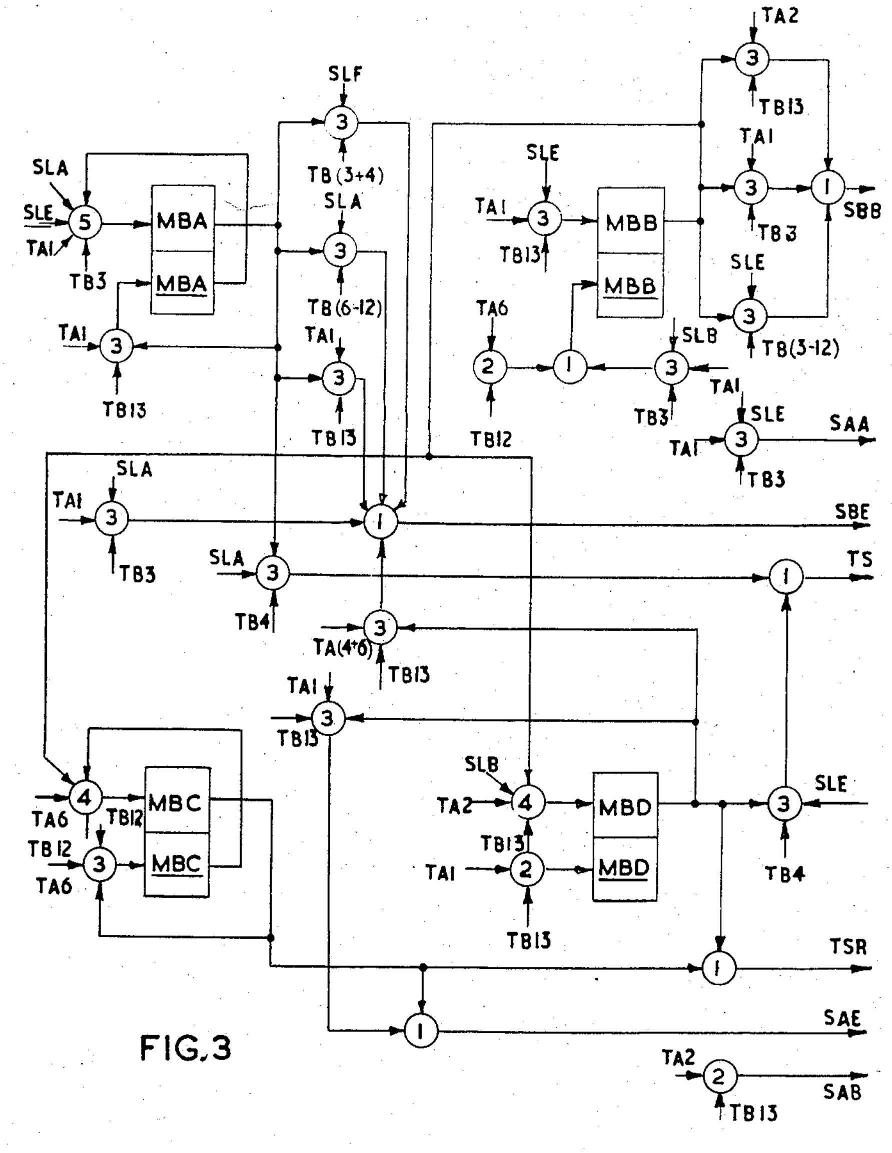

The various toggles with their associated circuits for controlling this operation are shown in Fig. 3 and it will be seen that the marking indicating that transmission is desired effects the operation of toggle MBA in the circuit:

$\underline{\text{MBA}}$.SLA.$\underline{\text{SLE}}$.TA1.TB3—MBA

This circuit, it will be appreciated, can only be completed if the transfer track is not at the moment in use as indicated by the term $\underline{\text{SLE}}$. The transfer track is now busied in the circuit:

SLA.TA1.TB3—SBE from the corresponding marking in the incoming register track. This marking is then removed in the circuit:

$\underline{\text{SLE}}$.TA1.TB3—SAA

The translated digit registered in TB4 of the main track is now operative to set a track switching device to render effective the reading and writing circuits for the particular track of outgoing registers leading in the desired direction. The appropriate circuit is:

MBA.SLA.TB4—TS

TS representing the appropriate track switching device which may comprise a group of toggles as is well known. The address of the calling register, i. e., that corresponding to the incoming junction, is then written into the transfer track:

MBA.SLF.TB(3+4)—SBE and the subscriber's number is also written into the transfer track in the circuit:

MBA.SLA.TB(6–12)—SBE and a further marking is made to indicate the instruction "hunt for free outgoing register":

MBA.TA1.TB13—SBE and MBA is then reset:

MBA.TA1.TB13—$\underline{\text{MBA}}$

This marking TA1.TB13 in the transfer track now initiates the hunting operation by operating toggle MBB:

SLE.TA1.TB13—MBB and the next register in the outgoing register track is marked to indicate that hunting has started:

MBB.TA2.TB13—SBB

This marking, however, is non-regenerative due to the circuit:

TA2.TB13—SAB

If the particular register on which operations are then taking place is busy, there will be a marking in TA1 of TB3 and MBB will be reset in the circuit:

SLB.TA1.TB3—$\underline{\text{MBB}}$

It will then be re-operated in the above circuit to test the succeeding register. When a free register is encountered, it is at once marked busy in the circuit:

MBB.TA1.TB3—SBB

The next operation comprises writing into the chosen outgoing register the address of the incoming register which is on the transfer track in TB(3+4) and the number of the wanted subscriber which is in TB(6–12):

MBB.SLE.TB(3–12)—SBB and when this is completed, MBB is reset:

TA6.TB12—$\underline{\text{MBB}}$

The transfer track can now be cleared and this is effected by the operation of toggle MBC:

$\underline{\text{MBC}}$.MBB.TA6.TB12—MBC

This toggle clears the transfer track

MBC—SAE and is then reset

MBC.TA6.TB12—$\underline{\text{MBC}}$

The operation of MBC, moreover, serves to reset the track switching device:

MBC—TSR

It is possible that all the junctions leading in the required direction are busy and since the assumption has been made that no re-routing is provided, this will prevent the establishment of the desired connection so that the busy signal should be sent back to the calling party since the connection cannot be completed. This operation is controlled by toggle MBD which is operated in the circuit:

MBB.SLB.TA2.TB13—MBD if the hunt continues until the starting point is reached. MBD now makes a marking in the transfer track to indicate that the called subscriber is busy:

MBD.TA4.TB13—SBE and a further marking in TA6 of this group to initiate hunting for the incoming register:

MBD.TA6.TB13—SBE

MBD also resets the track switching equipment:

MBD—TSR

This equipment has now to be set to select the track corresponding to the incoming junction which is at present set up on the transfer track in TB(3+4):

MBD.SLE.TB4—TS

The marking in TA1.TB13 which initiated hunting for an outgoing register is now removed

MBD.TA1.TB13—SAE and in the same position toggle MBD is reset

TA1.TB13—$\underline{\text{MBD}}$

The operation of the drum will now involve signaling back in connection with the incoming junction and this operation will be described in detail subsequently.

Assuming, however, that a free outgoing junction in the required direction is available, the position now reached is that the number to be transmitted has been written into the register corresponding to this outgoing junction and the record also includes, in TB3 and TB4, details of the address of the incoming junction in respect of which the original information was received.

Figures 2, 4, 6:
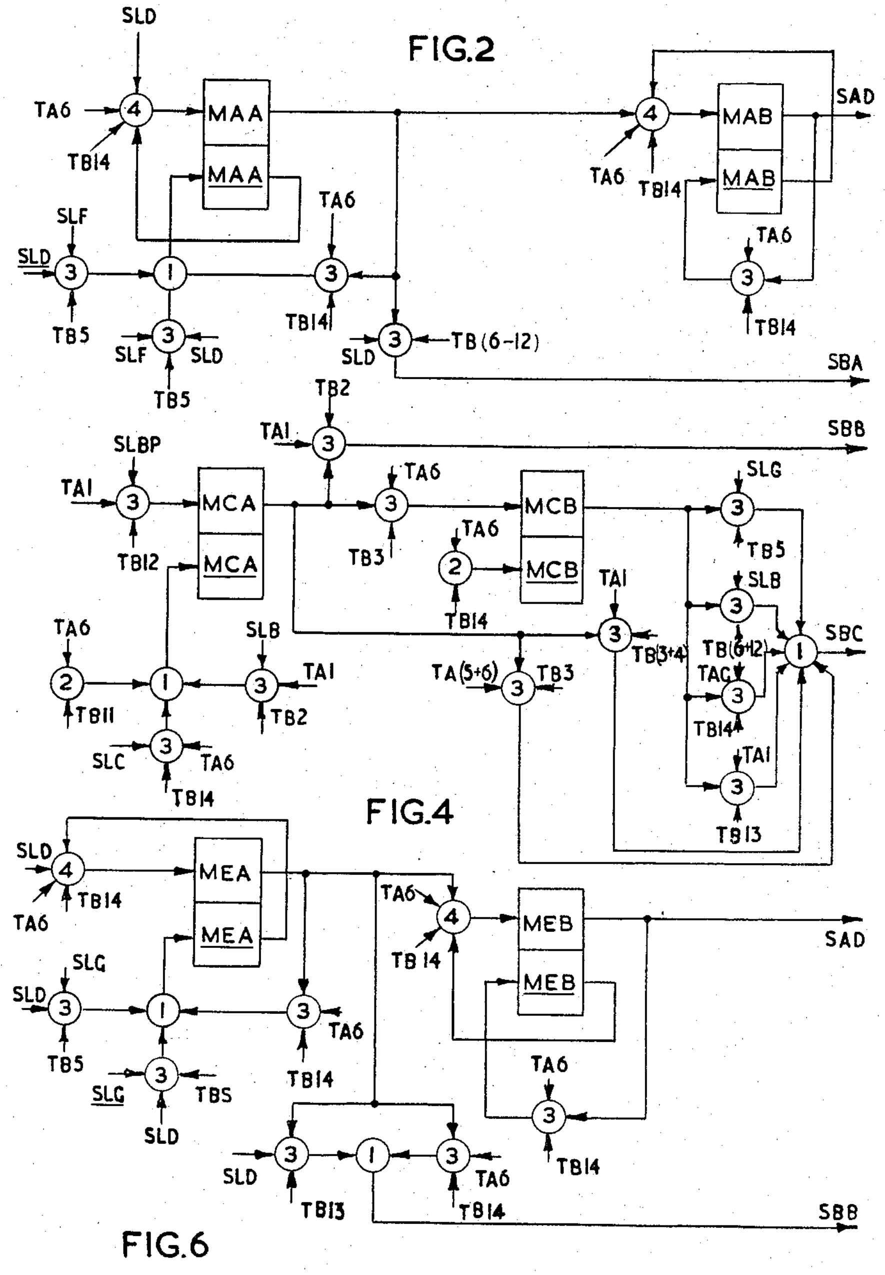

The next operation comprises transferring the information to the transmitter track preparatory to sending it on to the next exchange. For this purpose the panel comprising the three toggles MCA–MCC shown in Fig. 4 is employed and, owing to the busy marking in TA1.TB12 corresponding to the final digit of the subscriber's number, the auxiliary reading head effects the operation of toggle MCA:

SLBP.TA1.TB12—MCA

If the transmitter track is already in use, there will be a marking in TA6.TB14 and toggle MCA will be reset:

SLC.TA6.TB14—$\underline{\text{MCA}}$

If this does not occur, however, a marking is made in the outgoing register to indicate "information transmitted":

MCA.TA1.TB2—SBB

If this marking is encountered on any subsequent scan, it serves to reset MCA in order to prevent a further transmission:

SLB.TA1.TB2—$\underline{\text{MCA}}$

The next operation comprises the writing of the start signal (100011) in the transmitter track which is effected in the circuits:

MCA.TA1.TB3—SBC
MCA.TA(5+6)TB3—SBC

Toggle MCB is now operated in the circuit:

MCA.TA6.TB3—MCB and effects the writing of the number of the outgoing junction into the transmitter track from the outgoing junction address track:

MCB.SLG.TB5—SBC

In addition, the called subscriber's number is written into the transmitter track in the circuit:

MCB.SLB.TB(6—12)—SBC and two further markings are made in consequence of the circuits:

MCA.TA1.TB4—SBC
MCB.TA1.TB13—SBC

Finally, a marking is made in TA6.TB14 to indicate "information in track":

MCB.TA6.TB14—SBC

The toggles are reset by time pulses:

TA6.TB11—$\underline{\text{MCA}}$
TA6.TB14—$\underline{\text{MCB}}$

The information is now transmitted to the next transit exchange in a manner which will be described in detail subsequently. Similar circuits at other transit exchanges will operate in the same way until the information reaches the terminating exchange to which the wanted subscriber is connected. It is assumed that the drum in this exchange always carries information indicating whether the subscribers are idle or busy, which information may be obtained in known manner from a scanning device operating either on the lines themselves or on the associated P conductors. It will be assumed that, dependent on the condition of the line, there is a marking in either TA3 or TA4 of TB13 of what is the equivalent of the incoming register and also, at this time, a marking in TA6.TB14 of this register indicating that information is to be transmitted back. This latter marking is picked up by the auxiliary reading head and effects the operation of toggle MDA in the panel shown in Fig. 5:

SLAP.$\underline{\text{SLC}}$.TA6.TB14—MDA

This circuit, it will be understood, is only completed if there is information to be transmitted back and also if the transmitter track is free dependent upon the term $\underline{\text{SLC}}$. This marking is removed when the information has been transmitted due to the circuit:

$\underline{\text{SLC}}$.TA6.TB14—SAA

The start signal is now marked in the transmitter track in much the same way as previously described:

MDA.TA(1+5+6)TB3—SBC and relay MDA also effects the insertion of the busy markings in the TA1 positions for all the digits concerned:

MDA.TA1.TB(4—13)—SBC

When signalling back is taking place from an incoming register to the preceding outgoing register as is now being considered, the position of the information in the address tracks is inconvenient and the difficulty can most suitably be overcome by setting up the appropriate digit on four toggles in order to be able to transfer it to the right place in the transmitter track. These toggles are MDB, MDC, MDD and MDE and they are set up from the address track in the circuits:

MDA.SLF.TA3.TB3—MDB
MDA.SLF.TA4.TB3—MDC
MDA.SLF.TA5.TB3—MDD
MDA.SLF.TA6.TB3—MDE

The setting of these toggles then transfers the information to the transmitter track in the circuits:

MDB.TA3.TB5—SBC
MDC.TA4.TB5—SBC
MDD.TA5.TB5—SBC
MDE.TA6.TB5—SBC and all the toggles are reset by TB6.

The information to be transmitted back, namely the condition of the called party, is now written into the transmitter track by the circuit:

MDA.SLA.TB13—SBC and MDA is reset at the end of TB13 in the circuit:

TA6.TB13—$\underline{\text{MDA}}$

Transmission of this information now takes place in the manner to be described and appears on the receiver track at the other end of the common channel and it is now required to refer it to the relevant outgoing register. This is effected by the panel shown in Fig. 6 comprising the toggles MEA and MEB. The marking in TA6.TB14 in the receiver track now operates toggle MEA in the circuit:

$\underline{\text{MEA}}$.SLD.TA6.TB14—MEA

Hunting for the required register under the control of the outgoing register address track now takes place and as long as a difference in the number is found, toggle MEA is reset in the circuit:

(SLG.$\underline{\text{SLD}}$+$\underline{\text{SLG}}$.SLD)TB5—$\underline{\text{MEA}}$ If this circuit is not operative, however, because identity has been found, so that toggle MEA remains set until TB13, the information therein is transferred to the appropriate register:

MEA.SLD.TB13—SBB

Toggle MEB is now operated in the circuit:

$\underline{\text{MEB}}$.MEA.TA6.TB14—MEB and clears the receiver track by the circuit:

MEB—SAD and when this has taken place, it is reset:

MEB.TA6.TB14—$\underline{\text{MEB}}$

At the same time, MEA is reset in the circuit:

MEA.TA6.TB14—$\underline{\text{MEA}}$ immediately after having made a marking to indicate "information to be transmitted back":

MEA.TA6.TB14—SBB

This information has now to be transferred to the register associated with the incoming line from which the outgoing register in question was seized. This operation is controlled by the panel whose circuits are indicated in Fig. 7 comprising the toggles MFA . . . MFE. Toggle MFA is operated from the auxiliary reading head by the marking indicating "information to be transmitted back" in the circuit:

$\underline{MFA}$.SLBP.TA6.TB14—MFA but is almost at once reset if the transfer track is busy:

SLA.TA1.TB3—$\underline{MFA}$

If the transfer track is free, it is marked busy in the circuit:

MFA.TA1.TB3—SBE

The number of the calling register, i. e. that associated with the incoming junction, is now marked in the transfer track:

MFA.SLB.TB3—SBE and also the track switching device is operated to render effective the reading and writing circuits for the track in which the register in question is located:

MFA.SLB.TB4—TS

The number of the called i. e. outgoing junction register is now marked in the transfer track:

MFA.TB5.SLG—SBE and a marking is made in TA6.TB13 to initiate the hunting operation:

MFA.TA6.TB13—SBE

Moreover, it is necessary to remove the initiating marking to prevent the operation being repeated:

MFA.TA6.TB14—SAB and at the same time toggle MFA is reset:

MFA.TA6.TB14—$\underline{MFA}$

The marking in the transfer track indicating that hunting is to take place now operates toggle MFB:

$\underline{MFB}$.SLE.TA6.TB13—MFB

The usual test for coincidence is then made under the control of the circuit:

(SLF.$\underline{SLE}$+$\underline{SLF}$.SLE)TB3—$\underline{MFB}$ so that toggle MFB is reset until the required register is encountered. When this happens, it remains operated sufficiently long to enable the information in the transfer track to be written into the incoming register:

MFB.SLE.TB5—SBA
MFB.SLE.TA(3+4)TB13—SBA

It may be pointed out that the translation still retained in TB4 and the information now inserted in TB5 are required to control a subsequent impulse-sending operation for setting the switches over which the speaking connection will eventually be completed.

When the above operations have been completed, the toggle MFB is reset in the circuit:

MFB.TA4.TB13—$\underline{MFB}$

Slightly before this occurs, however, toggle MFC is operated $\underline{MFC}$.MFB.TA6.TB12—MFC and the transfer track is then cleared in the circuit:

MFC—SAE while MFC also resets the track switching equipment

MFC—TSR and in addition again inserts the marking "information to be transmitted back":

MFC.TA6.TB14—SBA

The setting of the switches in the speaking route may now take place under the control of the incoming register in known manner, the operation being controlled by the information in TB(4+5) and initiated by the receipt of the marking in TA3.TB13 indicating that the called subscriber is free.

A further operation remains to be described, namely, the clearing of the registers, and two cases arise, namely, clearing if the connection cannot be set up because the called subscriber is busy, and clearing at the end of a successful call. It will be noted that the information in the registers is retained until the subscribers hang up if the call is successful.

Figure 5:
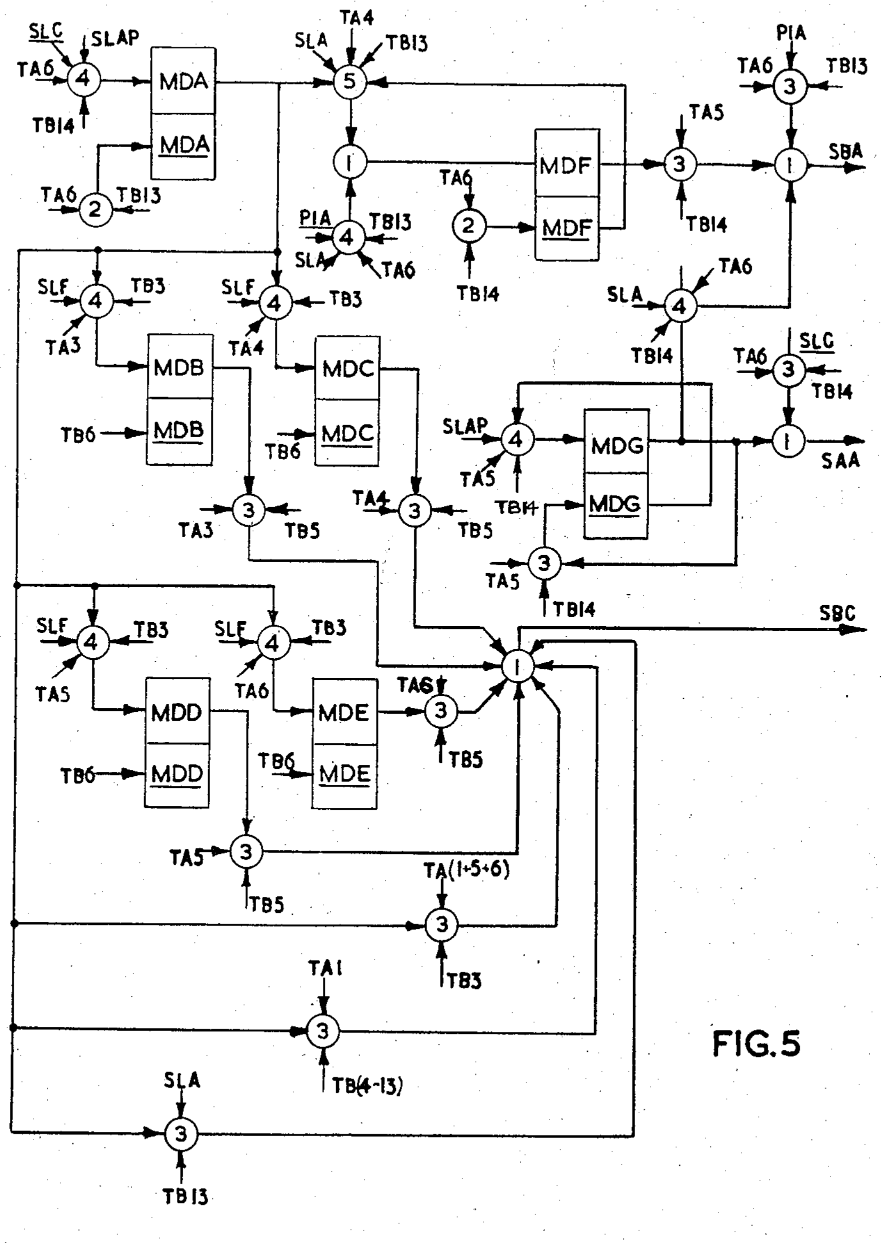

Considering first the case in which the called subscriber is busy, this will be indicated by a marking in TA4.TB13 so that the toggle MDF, Fig. 5, is operated from the incoming register:

$\underline{MDF}$.MDA.SLA.TA4.TB13—MDF

In these circumstances toggle MDF inserts a marking in TA5.TB14 to indicate that clearing of the register is required:

MDF.TA5.TB14—SBA and this marking then brings about the operation of toggle MDG under the control of the auxiliary reading head:

$\underline{MDG}$.SLAP.TA5.TB14—MDG

MDG then clears the register:

MDG—SAA and is reset after the whole register has been scanned:

MDG.TA5.TB14—$\underline{MDG}$

The marking in the final position TA6.TB14 is erased by other circuits but could in some circumstances be effected prematurely. If this should happen, it is rewritten in the circuit:

MDG.SLA.TA6.TB14—SBA

The operations for clearing the outgoing register under the control of the toggles shown in Fig. 7 are substantially similar. The marking indicating "called subscriber busy" operates toggle MFD:

MFA.SLB.TA4.TB13—MFD and this toggle then inserts the marking indicating that clearing of the register is required:

MFD.TA5.TB14—SBB

Toggle MFD is reset at the end of the register in the circuit:

TA6.TB14—$\underline{MFD}$

The marking in TA5TB14 now brings about the operation of toggle MFE under the control of the auxiliary reading head:

$\underline{MFE}$.SLBP.TA5.TB14—MFE and the register is cleared in the circuit:

MFE—AB and MFE is restored when this has been done

MFE.TA5.TB14—$\underline{MFE}$ and a marking may be made in TA6.TB14 in the circuit:

MFE.SLB.TA6.TB14—SBB in case it has been cleared prematurely.

As regards the clearance of the register at the end of a call, this is effected under the control of two scanners giving outputs PIA and PIB which are in continuous operation and produce outputs from the calling and called subscriber's lines respectively when they are in use.

As regards the incoming register, a marking is made in TA6.TB13 when the junction is taken into use (Fig. 5):

PIA.TA6.TB13—SBA and when the junction is no longer in use, this marking serves to operate toggle MDF which initiates the clearing operation as just described:

$\underline{\text{PIA}}$.SLA.TA6.TB13—MDF

Similarly, for the outgoing junction registers, the marking indicating that a junction is in use is made in the circuit (Fig. 7):

PIB.TA6.TB13—SBB and when the junction is freed, this marking brings about the operation of the toggle MFD:

$\underline{\text{PIB}}$.SLB.TA6.TB13—MFD

MFD then effects clearance of the outgoing register in the manner previously described.

Consideration will now be given to the details of the actual signalling equipment provided. As already mentioned, the signalling currents are produced by Gaussian modulating waves and each element represents two cycles of the carrier current. The equipment is shown in block schematic form in Fig. 8 from which it will be seen that the sine wave output from the 1200 c./s. oscillator O as indicated in the first line of Fig. 9 is passed to a sine wave squaring circuit SQ1 which gives a waveform corresponding to the second line of Fig. 9. This is fed to a toggle circuit MY of the Eccles-Jordan type and the reverse and normal outputs from this are represented in the third and fourth waveforms of Fig. 9. The direct output MY is passed to the strobe generator SG4 which produces an output *ts*4 shown in the fifth line of Fig. 9. These strobe pulses operate a toggle MZ which is accordingly set and reset at half the speed of the operation of the toggle MY to give a reverse output indicated in the sixth line in Fig. 9. The normal output from the toggle MZ is used to drive a second strobe generator SG1, the output *ts*1 from which is similar to the output *ts*4 but at half the frequency. The reverse outputs of MY and MZ are then combined in an AND gate giving a waveform as shown in the seventh line of Fig. 9. This is passed through a low-pass filter circuit LPF1 and produces the Gaussian waveform shown in the eighth line of Fig. 9. The output from the oscillator O is also passed through a phase shifter PS1 by means of which its phase is advanced 90° as shown in the ninth line of Fig. 9 and this sine wave is then modulated by the Gaussian wave derived from the low-pass filter circuit. Bearing in mind the phase relationship of the two inputs to the balanced modulator BM, the output will have the form shown on the tenth line of Fig. 9. This is now fed to a gate circuit GC controlled in accordance with the waveforms applied to leads SF and $\underline{\text{SF}}$ so that the continuous pulses from the balanced modulator only extend to the output amplifier OA when the gate is open. These pulses are then transmitted over the signalling channel, the impedance of which is preferably adjusted to 600 ohms.

Considering the equipment at the receiving end, this is shown in block schematic form in Fig. 13 and the waveforms corresponding to the different portions are shown in Fig. 14. The incoming signals indicated in the first line in Fig. 14 and corresponding to the last line in Fig. 9 extend to an amplifier AG with automatic gain control, whereby the received pulses are given a substantially constant amplitude and they are then fed to a full wave rectifier FR. The resulting waveform is shown in the second line on Fig. 14. The rectified pulses are then passed to a low-pass filter circuit LPF2 which produces negative-going pulses forming the output D′ after passing through the signal output circuit SO. The pulses are also supplied to an amplifier and inverter AIV by means of which they are converted to positive-going pulses and are fed to the inverted signal output circuit TSO giving the output $\underline{\text{D}}$′. The output D′ and its inverse $\underline{\text{D}}$′ are shown in lines 3 and 4 of Fig. 14. From the amplifier and inverter the pulses also extend to the automatic gain control rectifier circuit AGCR from which a suitable voltage is obtained to effect control of the incoming amplifier AG. In order to provide the necessary synchronising control, the output from the low-pass filter is also fed to a ringing circuit RC which produces a sine wave in phase with the Gaussian pulses as shown in the fifth line of Fig. 14. This wave is passed through a phase shifter PS2 by means of which it is given a phase shift of 90° as shown in line 6 and the pulses are then squared as shown in line 7 by the squaring circuit SQ2. They are then fed to a toggle MW, the reverse and normal outputs of which, shown in lines 8 and 9, are then used to drive two strobe generators SG2 and SG3 giving outputs *ts*2 and *ts*3 as shown in lines 10 and 11. These strobe pulses, it will be appreciated, are of the same frequency as the corresponding pulses *ts*1 at the sending end.

The detailed circuits of the pulse generator equipment shown in block schematic form in Fig. 8 will now be described and reference should be made to Figs. 10, 11 and 12, which should be arranged side-by-side in order.

The 1200 c./s. carrier oscillator comprises the double triode V1 having a common cathode resistor R1 and a tuned circuit comprising inductor L1 and capacitor C1 connected to the grid of the right-hand triode. The output from tuned circuit is applied to the control grid of the pentode valve V2 from which is obtained an output in the form of a sine wave of amplitude approximately 50 volts peak-to-peak. This is passed over capacitor C2 by way of the cathode follower V3 to the sine wave squaring circuit shown in the lower portion of Fig. 10 which is designed to give an accurately symmetrical square wave output for any sine wave input of over 15 volts peak-to-peak.

The secondary of the output transformer T1 is tuned to 1200 c./s. by capacitor C3 so as to give the maximum undistorted signal and zero phase shift. The first amplifying pentode V4 is A. C. coupled at the input and has a resistance of less than 300K between the control grid and cathode to minimise the effects of changes in the valve grid current. A further amplifying valve V5 is employed and the output is fed to the toggle circuit of Fig. 11 comprising the valves V6 and V7. This is a standard Eccles-Jordan circuit and its purpose is to steepen the rise and fall of the input square wave and to act as a phase splitter providing two output signals, one in phase and the other in antiphase with the input square wave.

The strobe generator SG4 comprising the valves V8 and V9 converts the falling edges of the input square wave into positive-going strobes *ts*4 which are arranged to be of amplitude 10 volts and rising from −10 volts. No output is produced by the rising edges of the input square wave. The output impedance of the circuit is kept very low so that it can be used to drive a large number of toggles from the transformer T2. The strobe *ts*4 is used to drive the toggle MZ which is not shown in detail since it is generally similar to the toggle MY represented by the valves V6 and V7. The toggle MZ is arranged to feed a further strobe generator SG1 which is not shown in detail since it is substantially similar to the strobe generator SG4 represented by the valves V8 and V9. It will be appreciated, however, that the toggle MZ acts as a frequency divider so that the frequency of the strobe *ts*1 from SG1 is only half the frequency of strobe *ts*4.

The output from the cathode of valve V6 represented by $\underline{\text{MY}}$ is combined with the output $\underline{\text{MZ}}$ by means of the rectifiers MR1 and MR2 and fed to the low-pass filter circuit by way of the cathode follower valve V10. The filter is essentially a constant-*k* type low-pass filter fed from a low impedance source. It is not ideal as regards its component values for the purpose of generating a Gaussian pulse, but is modified slightly to meet the other requirements of the circuit, bearing in mind the manner in which the pulse will be used to effect the actual signalling operation. In practice the output waveform from the filter is a compromise between a sine wave and a continuous series of Gaussian curves.

The output from the oscillator O is also fed to the phase shifter PS1 comprising the valve V11 shown in Fig. 12 in association with a suitable phase shifting network. This feeds the transformer T3 in the circuit of the balanced modulator BM and consists of an integrating circuit followed by a potentiometer resistor feeding an amplifier. The integrating circuit is arranged to adjust the phase of the 1200 c./s. carrier so that the minima of the modulating Gaussian waveform occur at the maxima of the 1200 c./s. carrier. The secondary of the transformer T3 is tuned to 1200 c./s. by means of the capacitor C3 so as to give a large undistorted carrier signal with zero phase shift.

The balanced modulator comprises essentially two pairs of valves V12 and V13 and V14 and V15 and the modulating Gaussian waveform is fed to the grids of two of these valves V12 and V14 from a tapping on potentiometer resistor R3 while the grids of the other two valves V13 and V15 are earthed for A. C. by a capacitor C4. By means of the large unbypassed cathode resistor R6 which may have the value 47K ohms, an effective push-pull input is obtained to the two pairs of valves. The heavy negative feedback produced by the large common cathode resistor when any of the valves amplifies the signal at its grid, reduces distortion of the signal at the valve anode and greatly increases the stability of the modulator. Each valve and its anode resistor acts as a potentiometer across the 1200 c./s. supply from transformer T3. Furthermore, the anode impedance of a triode for any given anode voltage varies with the grid bias. Thus, as the grid bias of one of the valves is decreased, so the anode impedance of the valve will increase and hence the proportion of the 1200 c./s. signal from T3 appearing at the valve anode will increase. The mean anode voltage of the valve also rises due to the amplified component of the signal at the grid which also appears at the anode. If now this mean anode voltage change is balanced out, leaving only the increasing amplitude of the 1200 c./s. carrier, the output signal will be 1200 c./s. amplitude-modulated by the signal at the valve grid. If the anode load resistor is large compared with the anode impedance of the valve and if the anode impedance of the valve varies linearly with the grid voltage, then the envelope of the output signal will be an undistorted form of the signal at the grid.

In practice, the anode load resistor can readily be made large compared with the anode impedance but the anode impedance does not vary exactly linearly with the grid voltage. Hence, the envelope of the modulated signal will always be a slightly distorted form of the modulating waveform when using this type of modulator. The 1200 c./s. carrier, however, since it is merely tapped down in the potentiometer formed by the valve and the anode load, will not be distorted provided the 1200 c./s. carrier amplitude at the valve anode is not large enough to change appreciably the value of the anode impedance over its voltage swing.

The modulating Gaussian waveform component at the anode of one valve is balanced out by adding together the output signal from this valve and that from another whose 1200 c./s. carrier and 600 c./s. modulating waveform are both out of phase with those applied to the first valve. The modulating waveform components at the two anodes will be of the same amplitude and opposite phases and will therefore balance out. At the instant when the grid bias voltages of the two valves are the same, there is zero output since the carrier signals of the two anodes are of the same amplitude and out of phase, but as the difference between the grid bias voltages increases, so the difference between the amplitude of the 1200 c./s. signals at the valve anode will increase and hence an output of 1200 c./s. carrier increasing in amplitude is obtained. This rate of increase at the combined output of two valves is twice that obtained at the anode of either of the valves alone. Thus, a modulated carrier is obtained without the D. C. component of the modulating waveform.

The circuit is arranged to give 100% modulation which is obtained when the difference between the two grid voltages follows the modulating waveform, such that at the negative peaks of the modulating waveform the grid voltages are equal and the 1200 c./s. output is zero and at the positive peaks the difference between the grid voltages is a maximum and the 1200 c./s. output is a maximum. This is achieved in the circuit by having a mean difference of 1 volt between the grid bias voltages and adjusting the level of the input modulating waveform to 2 volts peak-to-peak, the modulating waveform being A. C. coupled to one pair of grids. These grids are at a mean voltage level 1 volt positive with respect to the other pair which are decoupled to earth. At the negative peaks of the modulating waveform, the grid voltages are equal and there is no output and at the positive peaks the input grids are 2 volts positive with respect to the others and the maximum 1200 c./s. output is obtained.

The output is taken from the junction point of the resistors R6 and R7, the high value resistor R8 connected across resistor R7 serving to give a perfectly balanced output with complete elimination of the modulating waveform component. A balanced reverse output could be obtained from the junction of resistors R9 and R10 associated with the other pair of valves and together with the first output could be fed to a push-pull transformer to give a combined output. It was not considered desirable to do this, however, but it is still essential to use both pairs of valves for the satisfactory operation of the circuit.

The gate circuit shown in the lower portion of Fig. 12 makes use of the valves V16 and V17, the balanced modulator output being applied to the suppressor grid of V16 and the gating signal SF and its inverse *SF* to the respective control grids. The arrangement is that when SF is at −10 volts and *SF* at earth, the signal is allowed through, and when SF is at earth and *SF* at −10 volts, the signal is blocked. The toggle SF is strobed by *ts*1 as already described and it will be recalled that this strobe has a frequency of 600 c./s. These strobe pulses occur at the minima of the modulating Gaussian waveform and are coincident with alternate *ts*4 strobes. Thus, the gate is closed and opened only at the minima of the modulating waveform when there is zero signal output and the signal always comprises an integral number of complete pulses. The D. C. components of SF and *SF* at the valve anodes are balanced out by adjusting the potentiometer formed by resistor R11.

The output amplifier comprising the valve V18 follows normal practice and is provided with some negative current feedback. The time constant of the input circuit is adjusted to be long enough to pass all possible combinations of pulses without an appreciable shift in the D. C. level. The signals are passed to line by way of the transformer T4.

Figure 15:
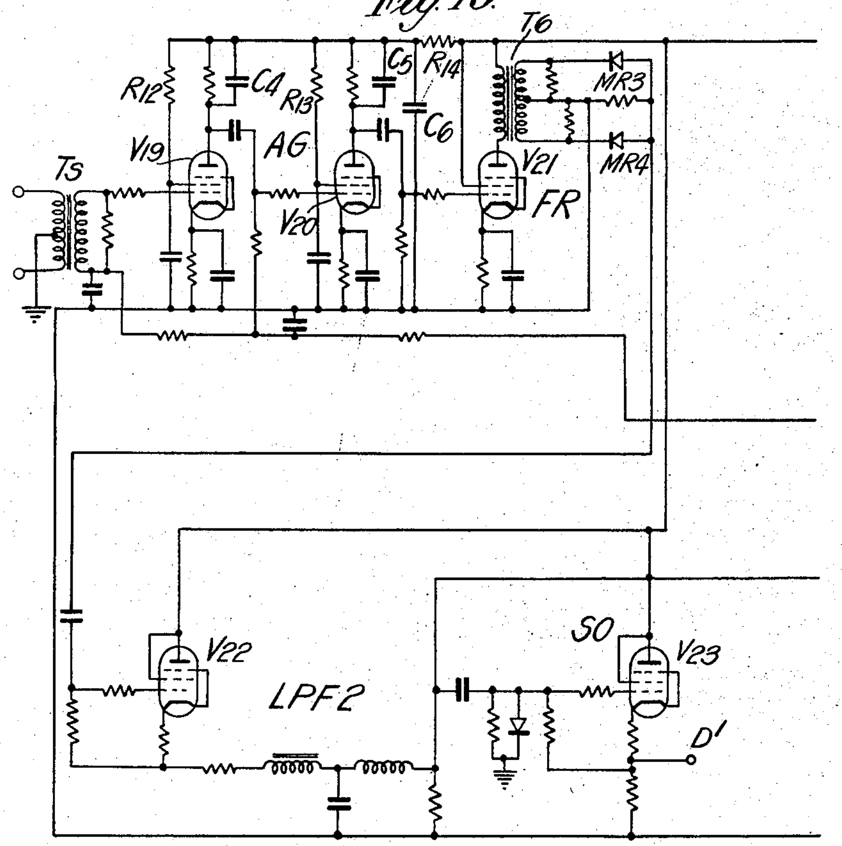
Figure 16:
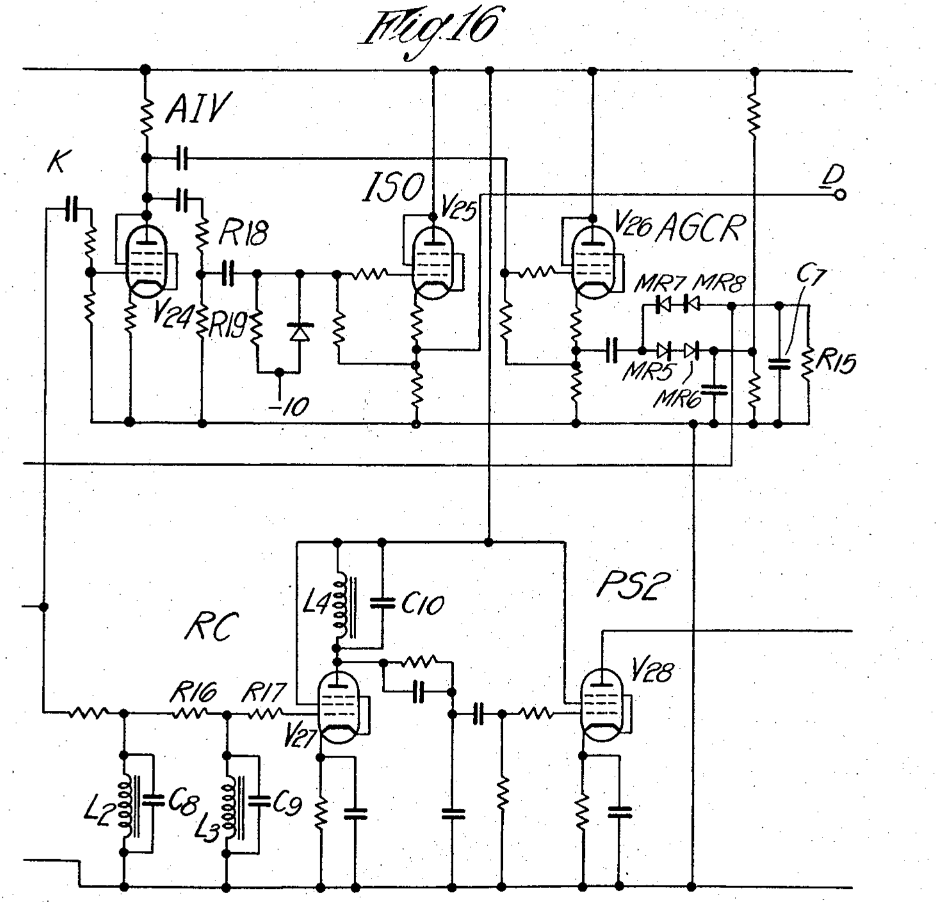
Figure 17:
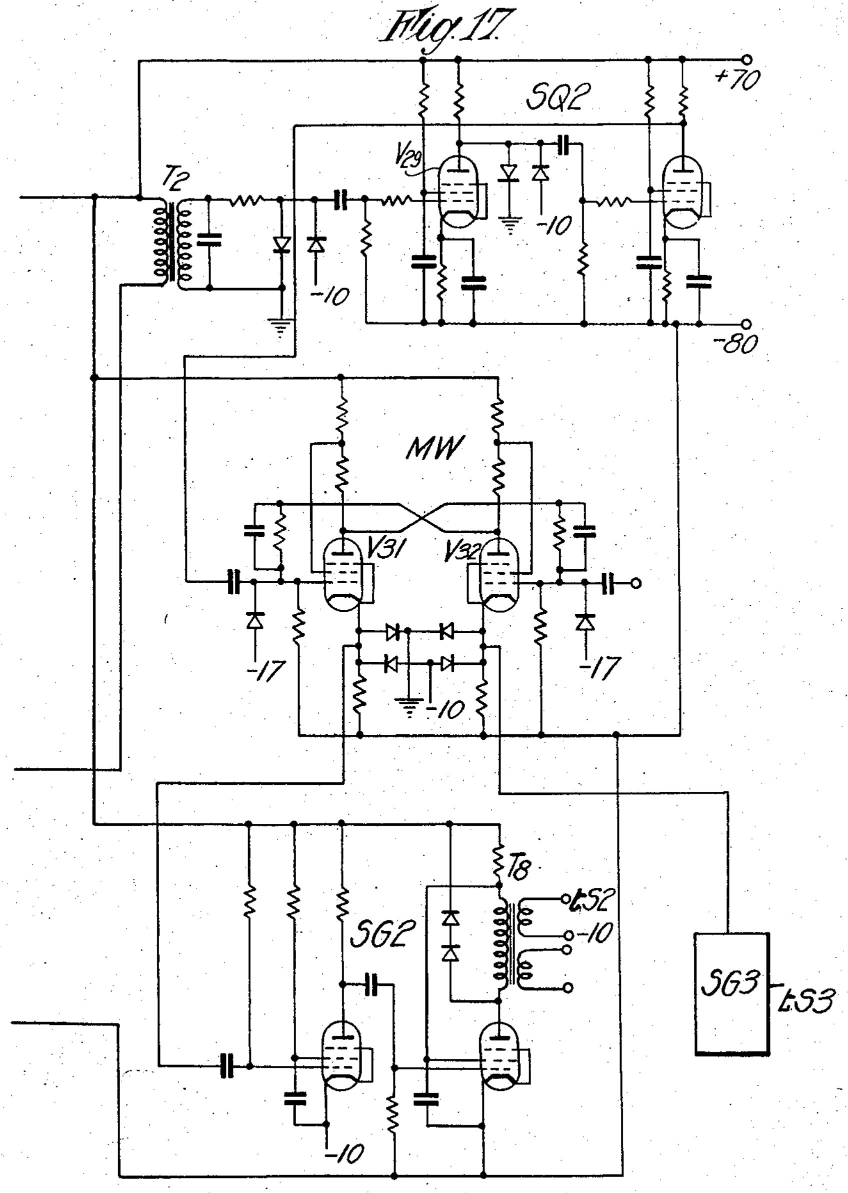

Considering now the details of the equipment at the receiving end, this is shown in Figs. 15–17 which correspond to the block diagram of Fig. 13 and should be arranged side-by-side in order.

The signals incoming from the line are applied to the transformer T5 and thence to a three-stage amplifier comprising the valves V19, V20 and V21 with an automatic gain control voltage fed to the first two stages. This voltage is derived from the amplified Gaussian signal pulses which gives a close degree of control. It is found that when the input signal increases from 0.1 to 2.5 volts peak-to-peak, the output signal only increases from 9.5 to 11.5 volts peak-to-peak without appreciable distortion. The use of the third valve V21 without automatic gain control ensures maximum undistorted signal output. The time constants associated with the cathode, screen and anode circuits of this valve are arranged to be long enough to prevent changes in the mean D. C. level of the output signal with all possible pulse combinations. The capacitors C4 and C5 connected across the load resistors R12 and R13 of the valves V19 and V20 respectively serve to reduce the high frequency response of the amplifier but do not prejudice the response over the band of frequencies concerned, namely, 400 to 2000 c./s. They tend, moreover, to prevent oscillation at high frequency when no automatic gain control voltage is applied. The resistor R14 connected in the common anode feed to the first two valves in this circuit and the high value capacitor C6 also serve to prevent low frequency oscillation under the same conditions.

The rectifiers MR3 and MR4 associated with transformer T6 serve to produce full-wave rectification which is desirable in these circumstances since only two cycles of the carrier current are being used.

The low pass filter circuit connected to the output of the cathode follower valve V22 is similar to the corresponding circuit at the transmitting end but the conditions of use at the receiving end permit it to approximate rather more closely to the theoretical ideal.

The output signals from the low pass filter circuit are negative-going Gaussian pulses whose amplitude is approximately 10 volts. The signal output circuit involving the valve V23 serves to clamp the positive base of the negative-going signal pulses to earth and provides a low impedance output from the cathode follower which is so arranged that the D. C. level at the output is the same as that at the input grid. The output signals are accordingly 10 volt negative-going Gaussian pulses whose base is clamped at earth. This signal output is described as D'.

As may be seen from Fig. 16, the A. G. C. voltage is derived from the output of the low pass filter by way of an amplifier and inverter and a rectifier circuit. Amplification is effected by the valve V24, the output being taken from the anode circuit to produce inversion. This output is tapped down by the potentiometer formed by resistors R18 and R19 to reduce the pulse amplitude to 10 v. peak and is then fed to the inverted signal output circuit comprising essentially the valve V25 which is connected similarly to the valve V23 and the output is tapped down in the cathode circuit of valve V25 to produce 10 volt positive-going Gaussian pulses whose base is clamped at −10 volts. The output is also fed to valve V26 and thence to a suitable rectifier circuit which is of the voltage doubling type and has a voltage delay of some 25 volts. The first section MR5 and MR6 of the rectifier circuit acts as a time-dependent clamp which clamps the positive peaks of the signal to +25 volts with respect to the −80 volts supply. As long as the amplitude of the signal is less than 25 volts peak-to-peak, the second pair of rectifiers MR7 and MR8 which couple the signal to the load comprising capacitor C7 and resistor R15 are non-conducting and the voltage at the output remains at zero. As soon as the signal exceeds 25 volts peak-to-peak, the negative peaks of the signal are passed through to the load and charge the reservoir capacitor C7 to a mean positive potential which depends on the signal amplitude. It is readily possible to calculate the value of capacitor C7 which will give the largest output voltage, but it is found that, for this value, the A. G. C. voltage depends, not only on the signal amplitude, but also on the frequency of the pulses. As will be appreciated from the subsequent description, this varies in accordance with the nature of the signal and it is therefore desirable to reduce the value of the capacitor C7 in order that this difficulty may be overcome.

As already pointed out, the pulses transmitted over the common signal channel have a further function to perform, namely, that of synchronisation and for this purpose the output from the low pass filter circuit also feeds the ringing circuit which includes three circuits tuned to 600 c./s. as shown in the lower part of Fig. 16. The first two, comprising respectively the inductors L2 and L3 and capacitors C8 and C9, are coupled through resistors R16 and R17 to the grid of the valve V27 and the third, comprising inductor L4 and capacitor C10, is included in the anode circuit of the valve. The output sine wave from the ringing circuit is 180° out of phase with the output Gaussian pulses represented by D'. This output is fed to the phase shifter comprising the valve V28 which alters the phase by 90° and amplifies it to approximately 50 volts peak-to-peak.

This output is then fed by way of transformer T7 to the sine wave squaring circuit SQ2, Fig. 17, which is similar to that at the transmitting end and comprises essentially the valves V29 and V30. The output from this circuit is accurately symmetrical and in phase with the input sine wave. The square wave output from the anode of valve V30 is fed to the toggle MW which is similar to the toggle MY in the transmitting circuit and comprises the valves V31 and V32 and its purpose is the same, namely, to steepen the rise and fall of the waveform so as to produce sharp signals from which the strobe outputs *ts2* and *ts3* may be obtained. These are of the same frequency but 180° out of phase, that is to say, the *ts3* strobe pulses occur midway between successive *ts2* pulses.

The strobe circuits are similar to that for the strobe generator SG4 shown in Fig. 11 and only the circuits for the strobe generator SG2 are shown in full. This comprises essentially the valves V33 and V34 and the strobe output over lead *ts2* is taken from the transformer T8. The strobe generator SG3 is indicated as operated from the cathode of valve V32 by the normal output of the toggle MW.

Consideration will now be given to the nature and method of operation of the equipment which controls the functioning of the equipment just described in connection with Figs. 8–17.

The nature of the 5-unit code employed for the transmission of decimal digits has already been mentioned and it has been explained that it comprises a binary code with the addition when required of an error detecting pulse to form the fifth unit. It also includes special signals for start, synchronise and erase and the whole code is set out in the following table.

| 1 | 2 | 3 | 4 | 5 | 6 | 7 | 8 | 9 | 0 | Synch. | Start | Erase |
|---|---|---|---|---|---|---|---|---|---|---|---|---|
| 1 | 0 | 1 | 0 | 1 | 0 | 1 | 0 | 1 | 0 | 0 | 0 | 1 |
| 0 | 1 | 1 | 0 | 0 | 1 | 1 | 0 | 0 | 1 | 0 | 0 | 1 |
| 0 | 0 | 0 | 1 | 1 | 1 | 1 | 0 | 0 | 0 | 0 | 1 | 1 |
| 0 | 0 | 0 | 0 | 0 | 0 | 0 | 1 | 1 | 1 | 0 | 1 | 1 |
| 0 | 0 | 1 | 0 | 1 | 1 | 0 | 0 | 1 | 1 | 1 | 1 | 1 |

It will be appreciated that at any exchange some of this control equipment is concerned with transmission and some with reception since it is clear that a transit exchange will terminate both incoming and outgoing junctions and also transmission takes place in both directions in connection with any particular call.

The clock system normally associated with the drum and concerned with the initial registration of the incoming information has already been assumed to provide the pulses TA and TB, there being 6 TA pulses to 1 TB pulse and 14 TB pulses corresponding to a single register. These clock pulses may be obtained from a special track on the drum or may be obtained from a set of interacting toggle circuits such as are about to be described as constituting the clock TX. In any event, the clock pulses must obviously be synchronised with the rotation of the drum. If they are in fact controlled by the drum, exact constancy of speed of rotation is not so important since small variations in drum speed will produce corresponding variations in the clock pulses.

Figure 18:
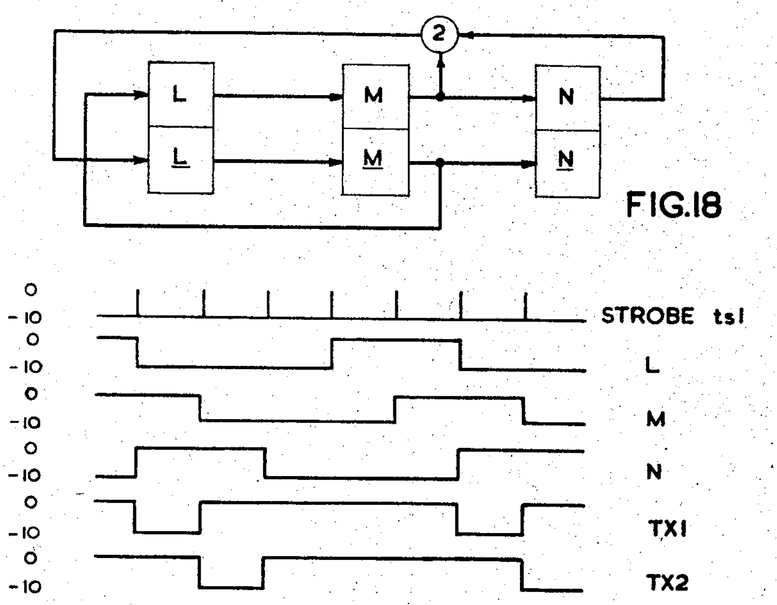

Considering now Fig. 18 which shows the method of driving the TX clock which controls transmission, this comprises three toggle circuits L, M, and N which are continuously operated under the control of the strobe *ts*1 which, as already pointed out, is governed by the output of the strobe generator SG1 indicated in Fig. 8 and shown in detail in Fig. 12. This operates at a frequency of 600 per second i. e. the "bit" frequency. The relationship between the toggles L, M and N may be expressed as follows:

$$\mathrm{L—M} \qquad \mathrm{\underline{M}—\underline{N}}$$
$$\mathrm{\underline{L}—\underline{M}} \qquad \mathrm{\underline{M}—L}$$
$$\mathrm{M—N} \qquad \mathrm{M.N—\underline{L}}$$

and the different pulses are then obtained as follows:

$$\mathrm{L.\underline{M}—TX1}$$
$$\mathrm{M.\underline{N}—TX2}$$
$$\mathrm{L.N—TX3}$$
$$\mathrm{\underline{L}.M—TX4}$$
$$\mathrm{\underline{M}.N—TX5}$$

The relationship of the various pulses is shown by the waveforms constituting part of Fig. 18 which indicate the outputs of the toggle and the manner in which these are combined to give pulses TX1 and TX2 by way of example.

Figures 19, 20:
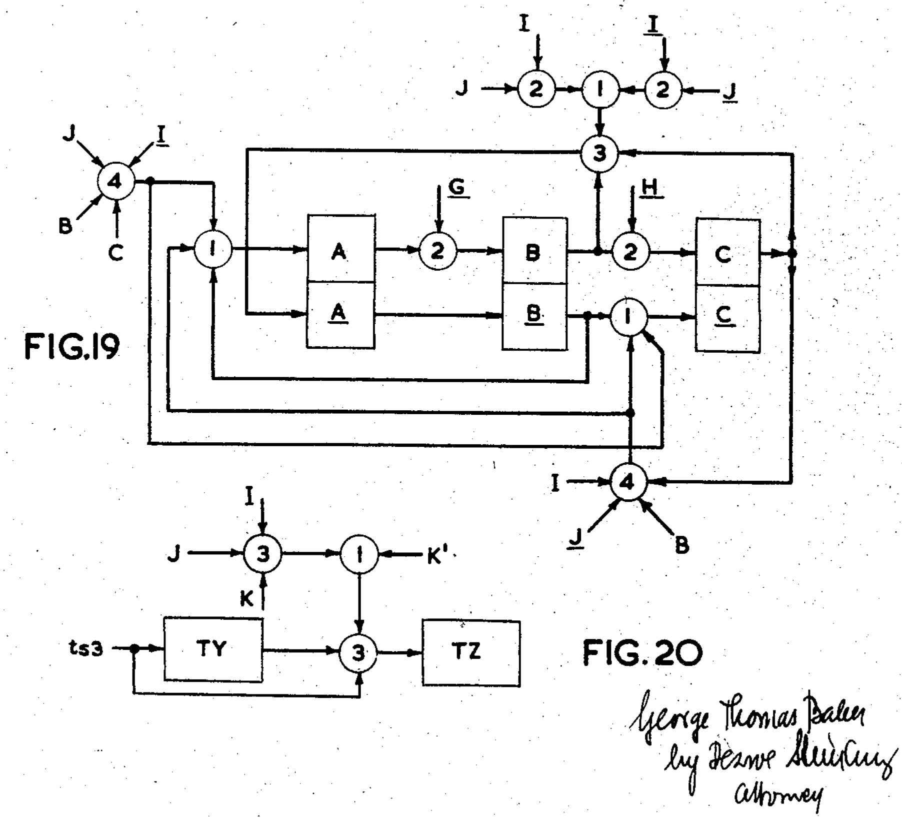

The circuits for the TY clock which is of course concerned with reception are shown in Fig. 19. They are basically similar to those for the TX clock in that they are controlled by the toggles A, B and C. In this case, however, an additional complication is caused by the fact that it is essential to synchronise the TY clock by the incoming impulses and this means they are subject to control from the toggles G, H, I and J which respond to incoming signals as will shortly be described in connection with Fig. 22. The circuits involved are:

$$\mathrm{\underline{G}.A—B}$$
$$\mathrm{\underline{A}—\underline{B}}$$
$$\mathrm{\underline{H}.B—C}$$
$$\mathrm{\underline{B}—\underline{C}}$$
$$\mathrm{\underline{B}—A}$$
$$\mathrm{(\underline{I}.\underline{J}+I.J)B.C—\underline{A}}$$
$$\mathrm{(I.\underline{J}+\underline{I}.J)B.C—A}$$
$$\mathrm{(I.\underline{J}+\underline{I}.J)B.C—\underline{C}}$$

The pulses TY1 . . . TY5 are obtained from the outputs of the toggles A, B and C in exactly the same way as the pulses TX1 . . . TX5 are obtained from the toggles L, M and N. The waveforms for the TY clock are accordingly not shown since they are the same as those shown in Fig. 18 for the TX clock.

Figures 21, 22:
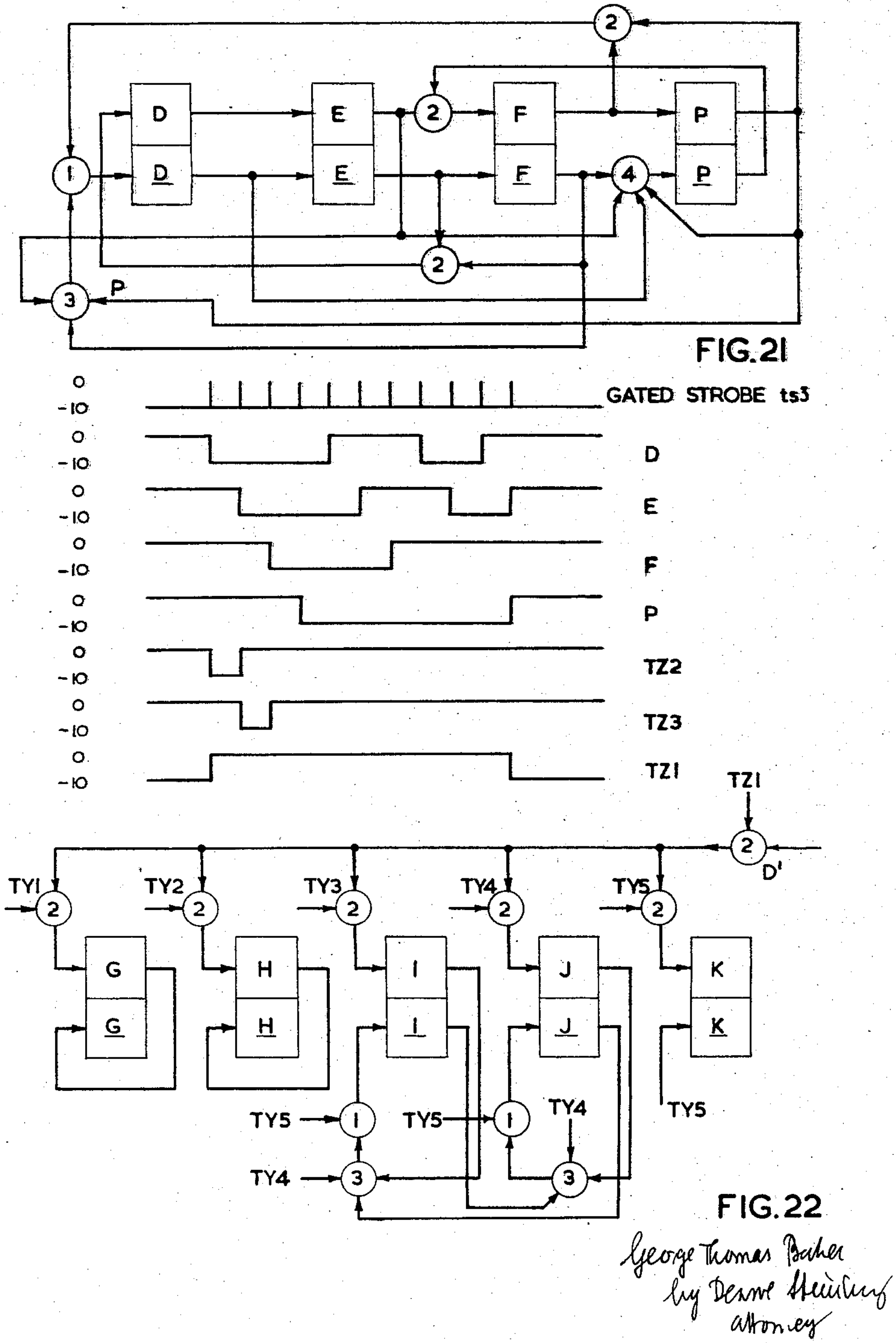
Figure 30:
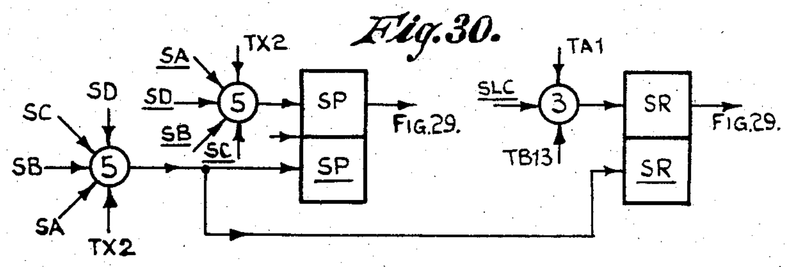
Figure 31:
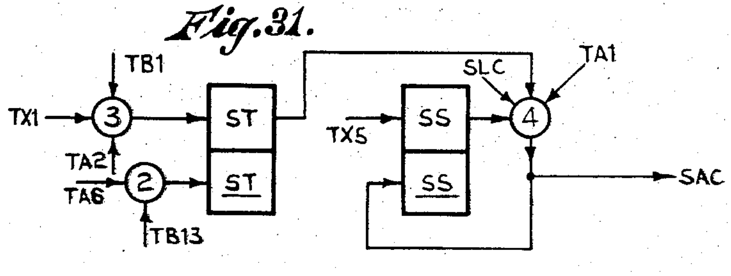

The circuits for the TZ clock are shown in Fig. 21 and since this is an 11-unit clock, it is necessary to employ four toggles D, E, F and P for giving the necessary pulses. Moreover, an additional control is required because the TZ clock, unlike the TX and TY clocks, only runs when a number is being transmitted, while, as already pointed out, the TX and TY clocks are always running and the latter is controlled by synchronising signals which are sent continuously when no information is being transmitted. The additional control of the TZ clock is indicated in Fig. 20 from which it will be seen that the TZ clock is operated through the triple And gate and is only operative if, at the same time, a strobe *ts*3 is received, a pulse from TY in position TY5 and a further pulse. This latter is controlled by relays I, J and K and since the TZ clock normally rests in the first position TZ1, this control may be expressed as:

$$ts\mathrm{3.TY5.I.J.K.—TZ2}$$

Figures 23, 32:
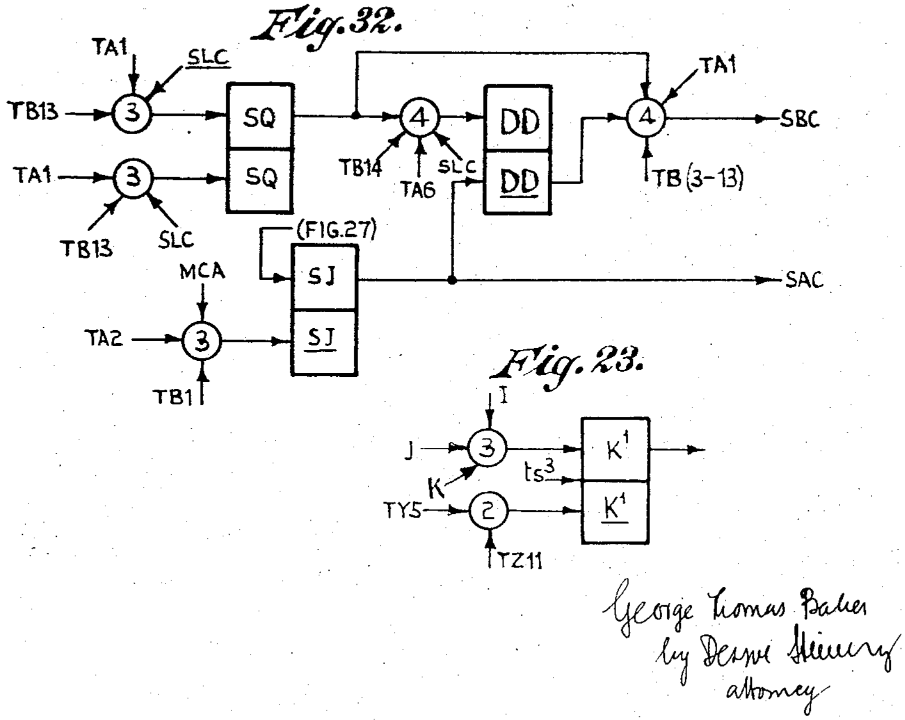

Control is also exercised by a toggle K′ shown in Fig. 23 which is operated on receipt of a start signal by the relays I, J and K:

$$\mathrm{I.J.K—K'}$$

and is only reset at the end of a complete operation of the TZ clock:

$$\mathrm{TY5.TZ11—\underline{K'}}$$

The other control for the TZ clock is therefore:

$$ts\mathrm{3.TY5.K'—TZ(3\text{-}11,1)}$$

The effect of K′ is to ensure that the TZ clock runs through a complete cycle when it is started by I, J and K since these relays will not again all be operated together during the remainder of a single transmitting operation.

The circuits for the toggles of the TZ clock are as follows:

$$\mathrm{D—E} \qquad \mathrm{\underline{E}—\underline{F}}$$
$$\mathrm{\underline{D}—\underline{E}} \qquad \mathrm{\underline{E}.\underline{F}—D}$$
$$\mathrm{F—P} \qquad \mathrm{E.\underline{P}—F}$$
$$\mathrm{F.P—\underline{D}}$$
$$\mathrm{E.\underline{F}.P—\underline{D}}$$
$$\mathrm{\underline{D}.E.\underline{F}.P—\underline{P}}$$

and the different pulses are then obtained as follows:

$$\mathrm{\underline{P}.\underline{D}—TZ1} \qquad \mathrm{\underline{D}.E.F.—TZ6}$$
$$\mathrm{D.\underline{E}.\underline{P}.—TZ2} \qquad \mathrm{\underline{E}.F—TZ7}$$
$$\mathrm{D.E.\underline{F}.\underline{P}.—TZ3} \qquad \mathrm{\underline{D}.\underline{E}.\underline{F}.P.—TZ8}$$
$$\mathrm{F.\underline{P}—TZ4} \qquad \mathrm{D.\underline{E}.P—TZ9}$$
$$\mathrm{D.F.P—TZ5} \qquad \mathrm{D.E.\underline{F}.P—TZ10}$$
$$\mathrm{\underline{D}.E.\underline{F}—TZ11}$$

The corresponding waveforms for the toggles D, E, F and P and for some typical TZ signals are shown in the lower part of Fig. 21. It will be noted that in the circumstances just explained, pulse TZ1 is of indeterminate length, while the pulses TZ2 . . . TZ11 are of the same length representing the interval between successive strobe pulses.

Considering now the starting circuit shown in Fig. 22, this comprises a series of five toggles G, H, I, J, K some of which have already been referred to. They are gated by the TY pulses so that they respond successively to the elements of each character according to the circuits:

$$\mathrm{D'.TY1.TZ1—G}$$
$$\mathrm{D'.TY2.TZ1—H}$$
$$\mathrm{D'.TY3.TZ1—I}$$
$$\mathrm{D'.TY4.TZ1—J}$$
$$\mathrm{D'.TY5.TZ1—K}$$

As will be appreciated from the table previously given, the start signal comprises the notation 00111 and as a consequence toggles I, J and K are operated. As previously pointed out, they then effect the operation of toggle K′, Fig. 23, and also effect the starting of the TZ clock which then goes through one cycle, being subsequently under the control of the toggle K′. The reset circuits for the various toggles are as follows:

$$ts\mathrm{3.G—\underline{G}}$$
$$ts\mathrm{3.H—\underline{H}}$$
$$\mathrm{\underline{I}.\underline{J}.TY4—\underline{I}}$$
$$\mathrm{TY5—\underline{I}}$$
$$\mathrm{\underline{\underline{I}}.J.TY4—\underline{J}}$$
$$\mathrm{TY5—J}$$
$$\mathrm{TY5—\underline{K}}$$

Figures 24, 25:
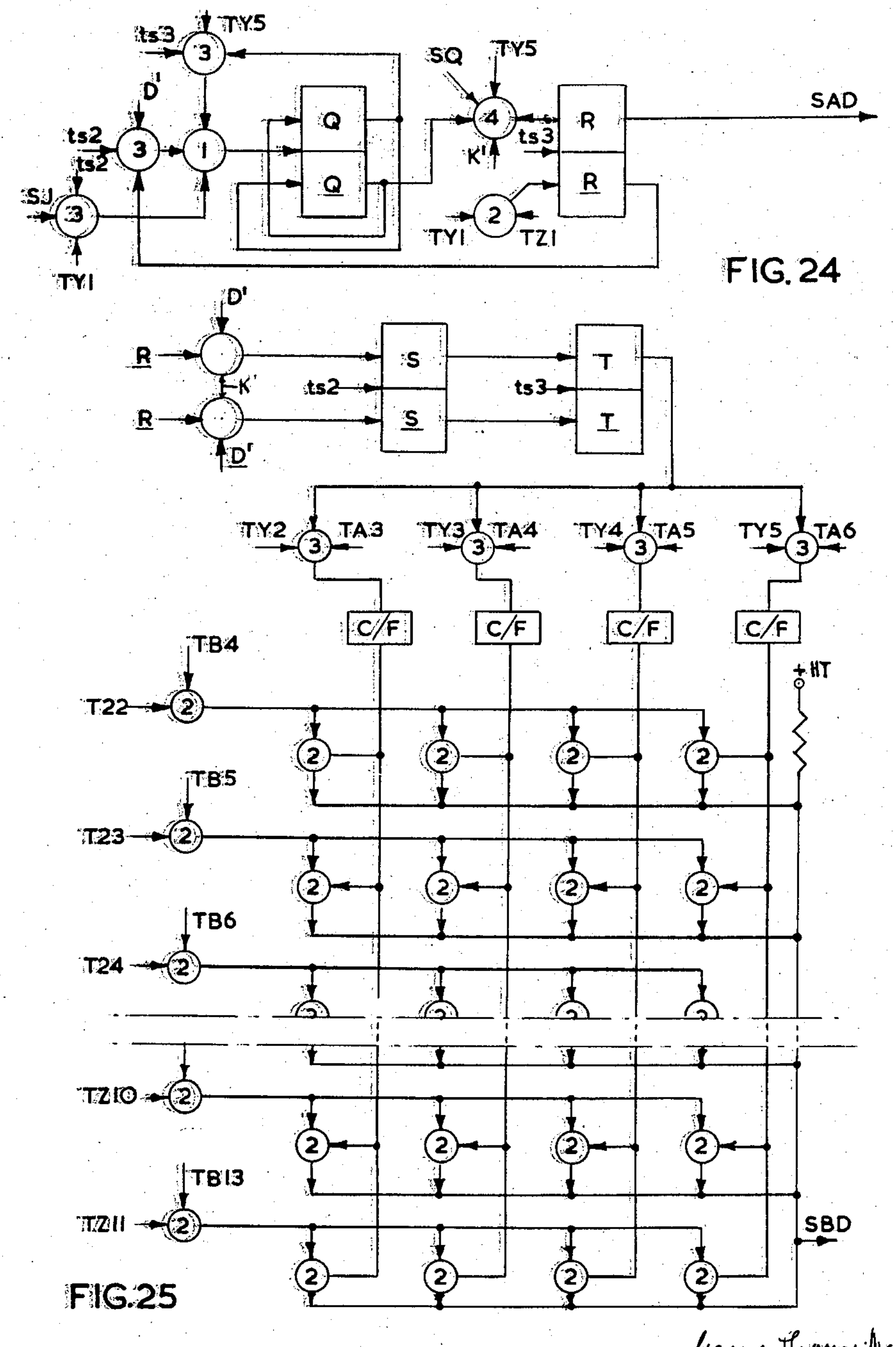

As already mentioned, the fifth unit of the character consists of an error detection pulse which is used if the number of pulses representing the number in binary code is even i. e. 2. The responding circuits for providing the required control are shown in Fig. 24 and the essential element is the toggle Q which is connected as a binary counter by means of the circuits:

$ts2.D'.\underline{R}.\underline{Q}\text{—}Q$ $ts2.D'.\underline{R}.Q\text{—}\underline{Q}$ $ts3.TY5.Q\text{—}\underline{Q}$ $ts2.SJ.TY1.Q\text{—}\underline{Q}$ If the total number of pulses received is even, this toggle will end up in the reset position in which it effects operation of the toggle R:

$\underline{SO}.K'.TY5.\underline{Q}\text{—}R$

The term $\underline{R}$ in a number of the circuits about to be described ensures that the operation does not proceed if there has been some error in transmission and the operated condition of relay R erases what has already been written on the receiver track:

$R\text{—}SAD$

Toggle R is reset at the end of each transmission in the circuit:

$TY1.TZ1\text{—}\underline{R}$

The input which is to operate the recording circuit shown in Fig. 25 is applied to the toggle S and is effective if the toggle R is not operated and the toggle K' has previously been operated, that is to say a start signal has been correctly received:

$\underline{R}.D'.K'\text{—}S$ $\underline{R}.\underline{D'}.K'\text{—}\underline{S}$ The toggle S, which is controlled by the strobe *ts*2, responds to the peaks of the Gaussian pulses and controls the toggle T which is operated by the strobe *ts*3 and produces square pulses for passing to the recording circuit:

$S\text{—}T$ $\underline{S}\text{—}\underline{T}$

The necessity for this conversion, making use first of the strobe *ts*2 and subsequently of the strobe *ts*3, means that the information is not available for putting on to the drum until the TY interval after it has been received. This delay is compensated for by using the appropriate TY in the matrix of Fig. 24. The rectangles marked CF represent cathode follower valves which are used to obtain a low impedance output. It will be seen that if a pulse is present as represented by the set condition of the toggle T, a corresponding potential is applied to lead SBD at the appropriate time to cause the writing of a 1 on the receiver track. This takes place for all the TZ pulses in turn and ensures the writing of the digits in the appropriate blocks represented by TB pulses. The relevant circuits are as follows:

T.TA3.TB4.TY2.TZ2—SBD
T.TA4.TB4.TY3.TZ2—SBD
- - - - - - - - - - - - - - - - - - - - - - - - -
T.TA5.TB13.TY5.TZ11—SBD
T.TA6.TB13.TY5.TZ11—SBD

These circuits are typical: there are in all 40 similar circuits.

It will be appreciated that sinze TZ1 does not affect the matrix, no record is made of the start signal and also because the time intervals corresponding to TY1 are not used, no record is made of the error detecting pulses in the digits in which they occur.

Figure 27:
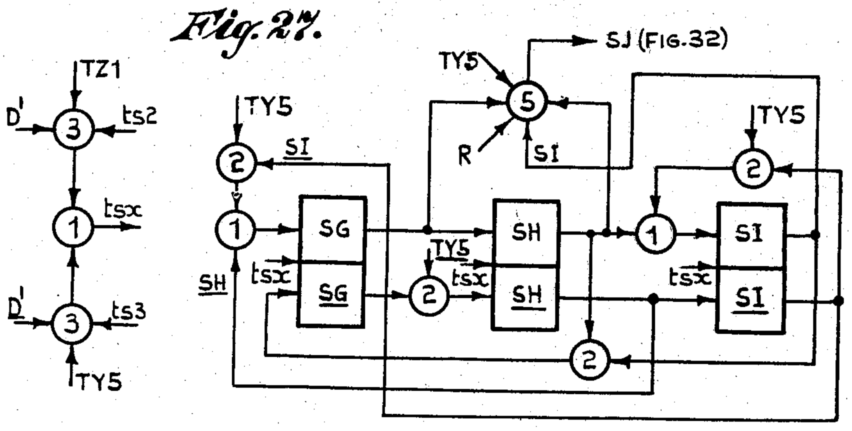
Figure 28:
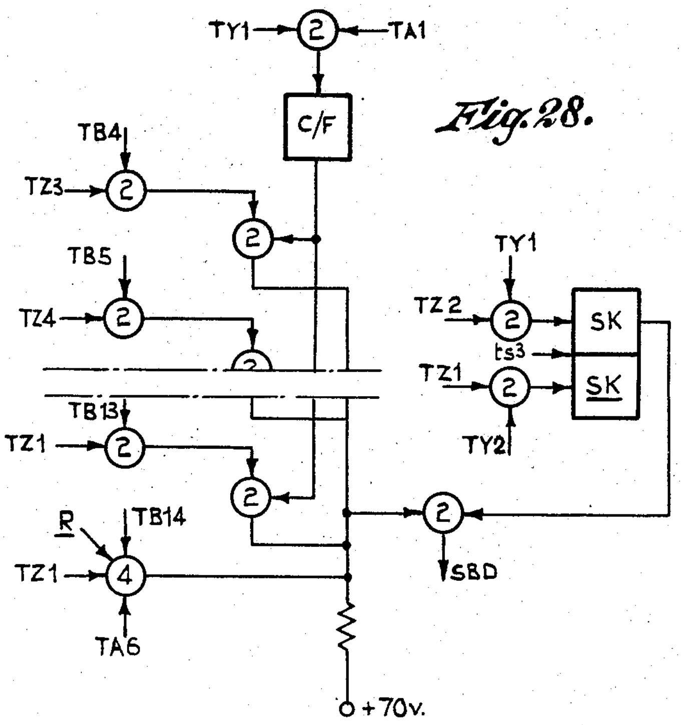

It will be convenient to deal with the remainder of the equipment at the receiving end and consideration will now be given to Fig. 27 showing the circuits for detecting the erase signal which comprises pulses in all five positions. The receiving circuit comprises toggles SG, SH and SI and in this case also special strobing arrangements are necessary to produce a strobe *tsx*, the circuits being:

$ts2.D'.TZ1\text{—}tsx$ $ts3.\underline{D'}.TY5\text{—}tsx$

The three toggles are connected in the form of a counting ring arranged to count from 1 to 5 and the circuits are:

$\underline{SI}.TY5+\underline{SH}\text{—}SG$ $SH.SI\text{—}\underline{SG}$ $SG\text{—}SH$ $\underline{SG}.\underline{TY5}\text{—}\underline{SH}$ $\underline{SI}.TY5+SH\text{—}SI$ $\underline{SH}\text{—}\underline{SI}$ All the toggles are normally in the set condition and, as will be appreciated, the strobe input is gated by the incoming pulses so that the circuit thus counts the pulses. If five pulses are received dusing a period corresponding to five pulse lengths, the circuit is driven round to its starting point and this condition is used to set SJ, Fig. 32:

$SG.SH.SI.\underline{R}.TY1\text{—}SJ$

As will be described later, SJ, when operated, clears the transmitter track:

$SJ\text{—}SAC$ and is reset from the drum control equipment in the circuit:

$MCA.TA2.TB1\text{—}\underline{SJ}$

The term $\underline{R}$ is included in the setting circuit for toggle SJ in order to distinguish from the case in which no pulses at all are received.

It should be explained that in the normal operation of the drum each TB block for registering a digit makes use of a marking in the first or TA1 position to control the subsequent processing of the digit. This marking is not transmitted over the signalling channel and means are therefore provided to insert it at the receiving end. This is done by means of the circuit of Fig. 28 comprising the toggle SK and a number of gate circuits. Toggle SK is reset at the end of each sending operation in the circuit:

$TY2.TZ1\text{—}\underline{SK}$ and is again operated when a new sending operation starts:

$TY1.TZ2\text{—}SK$

It then controls the insertion of the required marking for each digit after the digit itself has been recorded, typical circuits being:

SK.TA1.TB4.TY1.TZ3—SBD
SK.TA1.TB5.TY1.TZ4—SBD
SK.TA1.TB13.TY1.TZ1—SBD

This control circuit also inserts the marking in TA6.TB14 to indicate that information has been recorded:

$\underline{R}.SK.TA6.TB14.TZ1\text{—}SBD$

Figure 26:
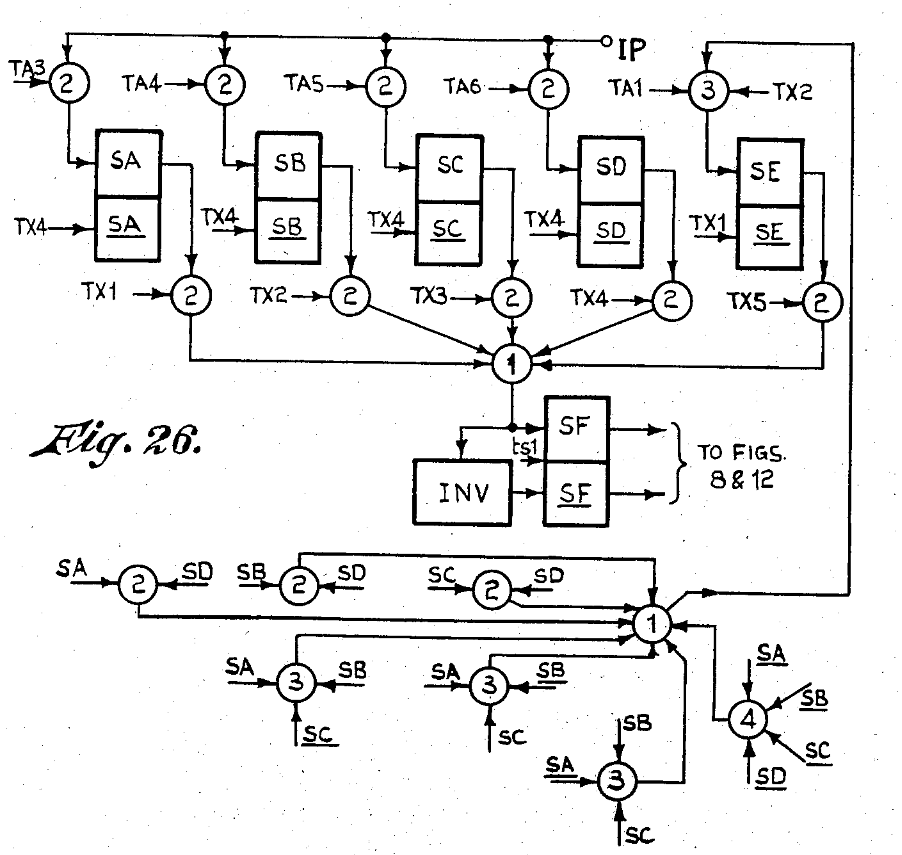

Returning now to the equipment for transmission purposes, attention will first be given to the transmission staticisor which is shown in Fig. 26. In view of the fact that, with the method of transmission proposed, the timing of the TX pulses is not definitely related to the operation of the drum, it has been found desirable that the information registered in the transmitter track in serial form shall be set up in parallel form on a staticisor from which it can be read out again under the control of the TX clock. It comprises a set of five toggles SA–SE corresponding to the five elements of the code, and it will be seen that these are set up under the control of the TA pulses associated with the drum. Thus, if an output is obtained from the transmitter track in position TA3, the toggle SA is operated and, similarly, TA4 controls SB, TA5 controls SC and TA6 controls SD or more specifically:

IP.TA3—SA
IP.TA4—SB
IP.TA5—SC
IP.TA6—SD

All these four toggles are reset by the time pulse TX4:

TX4—$\underline{SA}$+$\underline{SB}$+$\underline{SC}$+$\underline{SD}$

The toggle SE, as already explained, is associated with the error detection pulse and is operated under the control of pulses TA1 and TX2 and also an output obtained from various combinations of the toggles SA . . . SD if they have been set in accordance with genuine code combinations.

The possible circuits for SE are as follows:

TA1.TX2.SA.SD—SE
TA1.TX2.SB.SD—SE
TA1.TX2.SC.SD—SE
TA1.TX2.SA.SB.$\underline{SC}$—SE
TA1.TX2.SA.$\underline{SB}$.SC—SE
TA1.TX2.$\underline{SA}$.SB.SC—SE
TA1.TX2.$\underline{SA}$.$\underline{SB}$.$\underline{SC}$.$\underline{SD}$—SE The settings of the toggles are read out in turn under the control of pulses TX1 . . . TX5 and serve to effect the operation of the toggle SF, for instance in the circuits:

SA.TX1—SF
$\underline{SA}$.TX1—$\underline{SF}$

The common output is also applied to an inverter INV so that, if the particular toggle remains in its reset position, the toggle SF is operated to its reset position so as to give an output $\underline{SF}$. This avoids the necessity to take any reverse outputs from the toggles SA–SE. The outputs SF and $\underline{SF}$ are applied, as shown in Figs. 8, 9 and 12, to control the gate which allows the appropriate number of pulses to pass.

It should be explained that the various toggles SA . . . SE are set under the control of the strobe associated with the drum clocks TA and TB but are reset using the strobe *ts1* associated with the TX clock.

The full operation may be explained in greater detail as follows. At the end of TX4, toggles SA . . . SD are all reset. At a time TA1.TX5 a gate is opened and allows the decimal digit stored on the transmitter track in the TB concerned to appear in serial form at the input to the staticisor. The gate is closed by the signal TA6.TX5 and during this operation the error detecting element of the previous digit is being transmitted under the control of toggle SE. Hence, when the pulse TX1 occurs, there will be no break in the transmission sequence. At the end of TX1, toggle SE is reset in the circuit:

TX1—$\underline{SE}$ and is set again, if necessary, at time TA1.TX2 for the digit then in the staticisor. When there are no more TB blocks having a busy marking, there will be no input to the staticisor so that the toggles SA . . . SD will not be set and the transmitter sends 00001 which is the synchronising signal due to the operation of SE alone in the circuit:

$\underline{SA}$.$\underline{SB}$.$\underline{SC}$.$\underline{SD}$.TA1.TX2—SE

Figure 29:
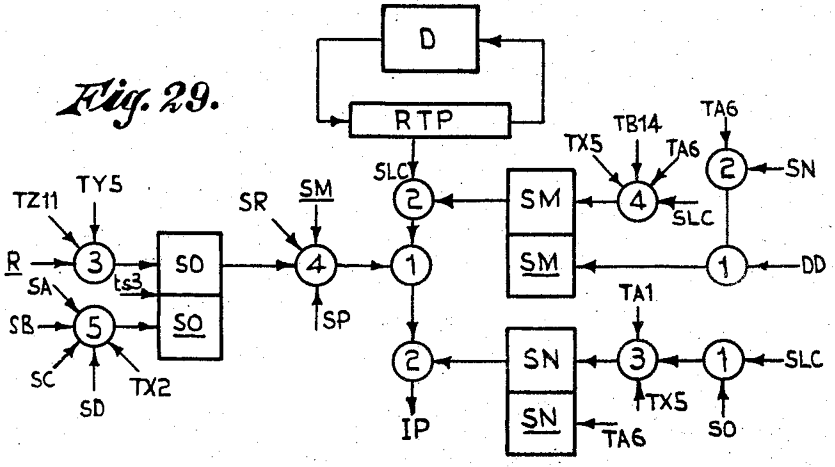

The way in which the output is applied to the staticisor is shown in greater detail in Fig. 29. Toggle SM is operated during TX5 by the marking in TA6.TB14 indicating that there is information to be transmitted:

SLC.TA6.TB14.TX5—SM

Toggle SN is set by the first TB block having a busy marking in the TA1 position:

(SLC+SO).TA1.TX5—SN

With both SM and SN operated, signals from the transmitter track are passed to the staticisor:

SLC.SM.SN—IP

Both these toggles are reset by TA6, whereupon the gate is closed:

TA6.SN—$\underline{SM}$
TA6—$\underline{SN}$

The toggle SO also shown in Fig. 29 is operated when it is desired to transmit back an erase signal in response to the successful reception of a complete number:

$\underline{R}$.TY5.TZ11—SO

It is reset when the staticisor is set up to transmit the erase signal:

SA.SB.SC.SD.TX2—$\underline{SO}$

However, as the two systems for signalling in opposite directions are largely independent as regards their timing, there is a danger that an erase signal might be sent confirming the correct receipt of a number in one direction at the same time as an entirely different number was being sent in the other direction and this obviously would result in faulty working. To prevent this happening, the input from SO to the staticisor is made dependent on toggles SP and SR shown in Fig. 30:

SO.SP.SR.$\underline{SM}$—IP

Toggle SP detects the fact that the staticisor is set up to send synchronising signals, i. e. that transmission of numbers is not taking place:

$\underline{SA}$.$\underline{SB}$.$\underline{SC}$.$\underline{SD}$.TX2—SP while SR detects that there is no marking in TB13 in the transmitter track which would indicate a signalling operation as to the state of the called subscriber's line:

$\underline{SLC}$.TA1.TB13—SR

Both these toggles are reset when the staticisor has been set up to transmit the erase signal:

TX2.SA.SB.SC.SD—$\underline{SP}$+$\underline{SR}$

As already mentioned, following the known method of working which is here assumed, the various TB storages are rendered effective in turn by means of a marking in the TA1 position which must therefore be removed when the particular TB position has been dealt with so that the following position is then the first to be encountered with a marking and therefore controls the operation. These markings are operative as each decimal digit is set up in the transmission staticisor and when transfer has taken place, it must be removed in order to enable the succeeding digit to become effective. This is brought about by the circuit of Fig. 31 involving the toggles SS and ST. Toggle SS is set at the end of TX5:

TX5—SS and toggle ST is set by the coincidence of various time pulses:

TA2.TB1.TX1—ST

The first marking to appear after the setting of SS and ST results in the cancellation of the marking in this position:

SLC.SS.ST.TA1—SAC and in order to ensure that only one marking is cancelled at a time, the same circuit resets SS:

SLC.SS.ST.TA1—$\underline{SS}$

ST is reset at the end of the scan in the circuit:

TA6.TB13—$\underline{ST}$

When the last decimal digit has been transmitted, a delay unit DD shown in Fig. 32 is operated in order to hold up transmission for a predetermined time. This is necessary to allow the receiver register at the other end of the line to be cleared and also to permit the erase signal to be sent back assuming transmission has taken place correctly. The delay is, however, made slightly longer than is necessary for these purposes and if the erase signal is not immediately received, this indicates that some error has occurred and that the transmission should be repeated. To enable this to take place, the markings in the various TA1 positions, which have been successively cancelled as just described, have to be re-inserted in order to permit the required re-transmitting operation. This re-insertion is effected by the toggles SQ and SJ in combination with the toggle DD. This latter toggle differs from the others which have been described in that it is a single-shot circuit; that is to say, after it has been operated, it is automatically reset after a predetermined time without any reset input being applied through a reset circuit is also provided for immediate rather than delayed operation. The circuit for the toggle SQ is as follows:

$\underline{\text{SLC}}$.TA1.TB13—SQ so that it is operated when there is no TA1 marking in the final TB position 13 in respect of which transmission takes place. When SQ is operated, a circuit is shortly completed for the toggle DD:

SLC.SQ.TA6.TB14—DD assuming that there is still a marking indicating that transmission should take place.

The toggle DD remains operated for a predetermined time during which the erase signal should be received. If this does not take place, the toggle DD on resetting rewrites all the TA1 markings in the circuit:

$\underline{\text{DD}}$.SQ.TA1.TB(3–13)—SBC

Toggle SQ is reset when a marking is found in TA1.TB13:

SLC.TA1.TB13—$\underline{\text{SQ}}$ so that the effect of the circuit is always to insert the TA1 markings except during the predetermined time of operation of DD. The toggle DD may also be reset by toggle SJ which was referred to in connection with Fig. 27:

SJ—$\underline{\text{DD}}$

SJ it will be recalled is set in response to the receipt of the erase signal and then clears the transmitter track:

SJ—SAD and is subsequently reset in the circuit:

MCA.TA2.TB1—$\underline{\text{SJ}}$

I claim:

1. In a telecommunication system, a surface of magnetic material, means for moving said surface in a closed path at a substantially constant speed, recording means adjacent to and co-operating with said surface, means including said recording means for recording on said surface a wanted telephone number, means responsive to the recording of the initial portion of said number for selecting an idle line leading in the required direction for setting up a call to said wanted number, a common signalling line extending to the same destination as said selected line and means for transmitting over said common signalling line information identifying said selected line.

2. In a telecommunication system, a surface of magnetic material, means for moving said surface in a closed path at a substantially constant speed, recording means adjacent to and co-operating with said surface, means including said recording means for recording on said surface a wanted telephone number, means responsive to the recording of the initial portion of said number for selecting one of a plurality of groups of lines, a common signalling line extending to the same destination as the lines of said selected group, and means controlled by the record on said surface for transmitting over said common signalling line information for controlling the further setting up of the connection.

3. In a telecommunication system, a pluality of exchanges, a surface of magnetic material located in one of said exchanges, means for moving said surface in a closed path at a substantially constant speed, recording means adjacent to and co-operating with said surface, means including said recording means for recording on said surface a wanted telephone number comprising an exchange selecting portion and a numerical portion, means responsive to the recording of said exchange selecting portion for selecting an idle line leading to another exchange, a common signalling line extending to said other exchange, and means controlled by the record on said surface for transmitting over said common signalling line information identifying said selected line and information for controlling the further setting up of the connection.

4. In a telecommunication system, a plurality of exchanges, a drum having a surface of magnetic material located in one of said exchanges, means for rotating said drum about its axis at a substantially constant speed, a writing head co-operating with said drum to define a circumferential track thereon, means including said writing head for recording in said track a wanted telephone number comprising an exchange selecting portion and a numerical portion, means responsive to the recording of said exchange selecting portion for selecting an idle line leading to another exchange, a common signalling line extending to said other exchange, and means controlled by the record in said track for transmitting over said common signalling line information identifying said selected line and information for controlling the further setting up of the connection.

5. In a telecommunication system, a surface of magnetic material, means for moving said surface in a closed path at a substantially constant speed, recording means adjacent to and co-operating with said surface, an incoming line, means for transmitting over said line impulses representing a wanted telephone number, means including said recording means for recording said number on said surface in a position characteristic of said incoming line, means responsive to said recording for selecting an idle line leading in the required direction for setting up a call to said wanted number, and means including said recording means for causing a numerical indication of the selected line to be recorded on said surface in association with the recording of said wanted number.

6. In a telecommunication system, a surface of magnetic material, means for moving said surface in a closed path at a substantially constant speed, recording means adjacent to and co-operating with said surface, an incoming line, means for transmitting over said line impulses representing a wanted telephone number, means including said recording means for recording said number on said surface in a position characteristic of said incoming line, means responsive to said recording for selecting an idle line leading in the required directing for setting up a call to said wanted number, means including said recording means for causing a numerical indication of the selected line to be recorded on said surface in association with the recording of said wanted number, a common signalling line extending to the same destination as said selected line and means controlled by the record on said surface for transmitting over said common signalling line information identifying said selected line and information for controlling the further setting up of the connection.

7. In a telecommunication system, a drum having a surface of magnetic material, means for rotating said drum about its axis at a substantially constant speed, a writing head co-operating with said drum to define a circumferential track thereon, means including said writing head for recording a wanted telephone number on said track, means responsive to said recording for selecting an idle line leading in the required direction for setting up a call to said wanted number and means including said writing head for causing a numerical indication of the selected line to be recorded in said track in association with the recording of said wanted number.

8. In a telecommunication system, a surface of magnetic material, means for moving said surface in a closed path at a substantially constant speed, recording means adjacent to and co-operating with said surface, a calling line, means for transmitting over said line impulses representing a wanted telephone number, means including said recording means for recording said number on said surface, means responsive to said recording and controlled by additional recordings on said surface for selecting an idle line leading in the required direction for setting up a call to said wanted number and means controlled by said recording for setting up a connection to said wanted number over said selected line.

9. In a telecommunication system, a surface of magnetic material, means for moving said surface in a closed path at substantially constant speed, recording means adjacent to and co-operating with said surface, means including said recording means for recording a wanted telephone number on said surface, means for comparing the initial portion of said recorded number with a plurality of permanent recordings on said surface, means selectively dependent on the position in which correspondence is found between the initial portion of said recorded number and one of said permanent recordings for choosing one of a plurality of further recording spaces on said surface and means for transferring to said chosen space at least a portion of the recording of said wanted telephone number.

10. In a telecommunication system, a drum having a surface of magnetic material, means for rotating said drum about its axis at substantially constant speed, a writing head co-operating with said drum to define a first circumferential track thereon, means including said writing head for recording a wanted telephone number in said first track, a second circumferential track on said drum, means for comparing the initial portion of said recorded number with a plurality of permanent recordings in said second track, a plurality of further circumferential tracks on said drum, means selectively dependent on the position in which correspondence is found between the recordings in said first and second tracks for choosing one of said plurality of further tracks and means for transferring to said chosen track at least a portion of the recording in said first track.

11. In a telecommunication system, a plurality of exchanges, a first drum at one of said exchanges having a surface of magnetic material, means for rotating said first drum about its axis at substantially constant speed, a first writing head co-operating with said first drum to define a first circumferential track thereon, means including said first writing head for recording a wanted telephone number in said first track, a second circumferential track on said first drum, means for comparing the initial portion of said number recorded in said first track with a plurality of permanent recordings in said second track, means selectively dependent on the position in which correspondence is found between the recordings in said first and second tracks for choosing a line extending to another of said plurality of exchanges, a second drum at said other exchange having a surface of magnetic material, means for rotating said second drum about its axis at substantially constant speed, a second writing head co-operating with said second drum to define a circumferential track thereon and means for transferring over said line to said track on said second drum at least a portion of the recording in said first track on said first drum.

12. In a telecommunication system, a surface of magnetic material, means for moving said surface in a closed path at substantially constant speed, recording means adjacent to and co-operating with said surface, a plurality of signal sources, an incoming signalling channel connecting said sources with said surface and common to said sources, means for transmitting information from any one of said sources over said channel together with a code characteristic of the particular source, and means including said recording means for recording said information on said surface in a storage space individual to said signal source as determined by said code.

13. In a telecommunication system, a drum having a surface of magnetic material, means for rotating said drum about its axis at substantially constant speed, a writing head co-operating with said drum to define a circumferential track thereon, a plurality of signal sources, an incoming signalling channel connecting said sources with said drum and common to said sources, means for transmitting information from any one of said sources over said channel together with a code characteristic of the particular source and means including said writing head for recording said information in said track in a position individual to said signal source as determined by said code.

14. In a telecommunication system, a drum having a surface of magnetic material, means for rotating said drum about its axis at substantially constant speed, a first writing head co-operating with said drum to define a first circumferential track thereon, a plurality of signal sources, storage spaces in said first track associated respectively with said sources, an incoming signal channel connecting said sources with said drum and common to said sources, a second writing head co-operating with said drum to define a second circumferential track thereon, means for transmitting information from any one of said sources over said channel together with a code characteristic of the particular source, means including said second writing head for recording said information and said code in said second track and means including said first writing head for recording said information in said first track in the storage space individual to said source.

15. In a telecommunication system, a first exchange, a second exchange, a plurality of lines extending from said first exchange to said second exchange, a plurality of signal sources in said first exchange associated respectively with said lines, a surface of magnetic material located in said second exchange, means for moving said surface in a closed path at substantially constant speed, recording means adjacent to and co-operating with said surface, a signalling channel extending from said first exchange to said second exchange and common to said sources, means for transmitting information from any one of said sources over said channel together with a code characteristic of the particular source, means including said recording means for recording said information on said surface in a storage space individual to said signal source as determined by said code, and means for extending a connection in accordance with said information from the line associated with the source concerned.

16. In a telecommunication system, a first exchange, a second exchange, a signalling line extending from said first exchange to said second exchange, means in said first exchange for storing a decimal digit in binary code, means in said first exchange for transmitting over said line pulses corresponding to said binary storage in separate pulse positions together with an additional check pulse if the number of binary units is even, a scale-of-two counter in said second exchange responsive to each of said signalling pulses, receiving equipment in said second exchange corresponding to each pulse position and selectively responsive to individual pulses, and means controlled by said scale-of-two counter for cancelling the setting of said receiving equipment if said scale-of-two counter is restored to its initial position by an even number of said pulses.

17. In a telecommunication system, a first exchange, a second exchange, a signalling line extending from said first exchange to said second exchange, means in said first exchange for storing a decimal digit in binary code, means in said first exchange for transmitting over said line pulses corresponding to said binary storage in separate pulse positions together with an additional check pulse if the number of binary units is even, a scale-of-two counter in said second exchange responsive to each of said signalling pulses, receiving equipment in said second exchange corresponding to each pulse position and selectively responsive to individual pulses, means controlled by said scale-of-two counter if it is not restored to its initial position at the end of said pulse transmission for transmitting a confirming signal back to said first exchange and means controlled by said scale-of-two counter if it is restored to its initial position for cancelling the setting of said receiving equipment.

18. In a telecommunication system, a first exchange, a second exchange, a signalling line extending from said first exchange to said second exchange, a first high-speed magnetic storage device at said first exchange, means for recording information on said first storage device, means at said first exchange for generating a carrier current of voice frequency, means at said first exchange for modulating said carrier current in accordance with said stored information, means for transmitting said modulated carrier current over said signalling line, means at said second exchange for responding to said modulated carrier current, a second high-speed magnetic storage device at said second exchange and means controlled by said responding means for recording said received information on said second storage device.

19. In a telecommunication system, a first exchange, a second exchange, a signalling line extending from said first exchange to said second exchange, a first high-speed magnetic storage device at said first exchange, means for recording information on said first storage device, means at said first exchange for generating a carrier current of voice frequency of substantially sine wave form, means at said first exchange for modulating said carrier current with a Gaussian waveform to produce pulses in accordance with said stored information, means for transmitting said modulated carrier current over said signalling line, means at said second exchange for responding to said modulated carrier current, a second high-speed magnetic storage device at said second exchange and means controlled by said responding means for recording said received information on said second storage device.

20. In a telecommunication system, a first exchange, a second exchange, a signalling line extending from said first exchange to said second exchange, a first high-speed magnetic storage device at said first exchange, means for recording information on said first storage device, means at said first exchange for generating a carrier current of voice frequency of substantially sine wave form, means at said first exchange for modulating said carrier current with a Gaussian waveform to produce pulses in accordance with said stored information comprising an integral number of cycles of said carrier wave, means for transmitting said modulated carrier current over said signalling line, means at said second exchange for responding to said modulated carrier current, a second high-speed magnetic storage device at said second exchange and means controlled by said responding means for recording said received information on said second storage device.

21. In a telecommunication system, a first exchange, a drum having a surface of magnetic material at said first exchange, means for rotating said drum about its axis at substantially constant speed, a writing head co-operating with said drum to define a circumferential track thereon, means including said writing head for recording information in said track, a second exchange, a line extending from said first exchange to said second exchange, means at said first exchange for generating a carrier current of voice frequency, means at said first exchange for modulating said carrier current, means for transmitting pulses of said modulated current over said line in accordance with the information recorded on said track and a register device in said second exchange for responding to said pulses.

22. In a signalling system for transmitting numerical information in the form of separate decimal digits each represented by pulses selectively located in a plurality of pulse positions, a drum having a surface of magnetic material, means for rotating said drum about its axis at a substantially constant speed, a writing head cooperating with said drum to define a circumferential track thereon, means for recording a plurality of digits in binary code in said track, a register comprising a plurality of units corresponding to said signalling pulse positions, means for transferring to said register the record of one of said digits on said track, means for generating a series of clock pulses, a signalling line, means controlled by said clock pulses for transmitting the contents of said register over said signalling line, and means responsive to the completion of such transmission for transferring the record of the succeeding digit from said track to said register.

References Cited in the file of this patent

UNITED STATES PATENTS

| | | |
|---|---|---|
| 2,738,382 | Brooks et al. | Mar. 13, 1956 |
| 2,740,003 | Newby | Mar. 27, 1956 |
| 2,764,634 | Brooks et al. | Sept. 25, 1956 |